United States Patent
Kim et al.

(10) Patent No.: US 8,170,499 B2
(45) Date of Patent: May 1, 2012

(54) MOBILE TERMINAL AND CHANNEL SCANNING METHOD THEREOF

(75) Inventors: Mun Gyu Kim, Gyeonggi-do (KR);
Yong Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 460 days.

(21) Appl. No.: 12/243,828

(22) Filed: Oct. 1, 2008

(65) Prior Publication Data

US 2009/0143067 A1    Jun. 4, 2009

(30) Foreign Application Priority Data

Nov. 30, 2007 (KR) .................. 10-2007-0123223

(51) Int. Cl.
*H04M 11/08* (2006.01)
*H04M 11/00* (2006.01)

(52) U.S. Cl. .............. 455/77; 455/74; 455/150.1

(58) Field of Classification Search ........... 455/77, 455/120, 173.1–200.1, 566, 414.1–418, 422.1, 455/454, 145–148, 154.1–168.1; 725/56–72, 725/101; 348/570, 731–732

See application file for complete search history.

(56) References Cited

U.S. PATENT DOCUMENTS

| | | | |
|---|---|---|---|
| 2004/0105031 A1 | 6/2004 | Shibusawa | |
| 2005/0122429 A1 | 6/2005 | Katsube et al. | |
| 2006/0085384 A1* | 4/2006 | Sato et al. | 707/1 |
| 2006/0099962 A1* | 5/2006 | Lee | 455/456.2 |
| 2007/0067813 A1* | 3/2007 | Yen | 725/95 |
| 2007/0263124 A1* | 11/2007 | Nishi | 348/570 |
| 2008/0005768 A1* | 1/2008 | Sakai | 725/73 |
| 2008/0127257 A1* | 5/2008 | Kvache | 725/39 |
| 2008/0151862 A1* | 6/2008 | Goodwin et al. | 370/351 |
| 2008/0274768 A1* | 11/2008 | Toriumi et al. | 455/556.1 |

FOREIGN PATENT DOCUMENTS

| | | |
|---|---|---|
| EP | 1791264 | 5/2007 |
| EP | 1802107 | 6/2007 |

OTHER PUBLICATIONS

Harman/Becker Automotive Systems GmbH, "Becker TriVision 7970/7972 Instruction Manual," 2005.

* cited by examiner

*Primary Examiner* — Ajit Patel
*Assistant Examiner* — Erica Navar
(74) *Attorney, Agent, or Firm* — Lee, Hong, Degerman, Kang & Waimey

(57) ABSTRACT

A mobile terminal is provided that includes a wireless communication unit configured to receive channel information and scan at least one channel, a controller configured to generate a channel database using the received channel information and generate a channel list according to a result of real time channel scanning using the channel database, and an output unit configured to display the channel list according to the result of the real time channel scanning under control of the controller.

6 Claims, 23 Drawing Sheets

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL AND CHANNEL SCANNING METHOD THEREOF

Pursuant to 35 U.S.C. §119(a), this application claims the benefit of earlier filing date and right of priority to Korean Application No. 10-2007-0123223, filed on Nov. 30, 2007, the contents of which are hereby incorporated by reference herein in their entirety.

FIELD OF THE INVENTION

The present invention relates to a terminal, in particular, to a mobile terminal and channel scanning method thereof. Although the present invention is suitable for a wide scope of applications, it is particularly suitable for a mobile terminal having broadcast receiving and outputting functions.

DESCRIPTION OF THE RELATED ART

A mobile terminal may be configured to perform various functions. Examples of such functions include data and voice communications, capturing and displaying images and video via a camera and a display, respectively, recording audio, and playing music files via a speaker system. Mobile terminals may also be used for playing games and multimedia. More recently, some mobile terminals have been configured to receive broadcast and multicast signals which permit viewing of contents such as videos and television programs.

In a broadcast terminal in related art, a channel list, which shows channels available for broadcast receptions, is displayed after channel scanning is completed. However, such terminal in the related art is not able to generate and display a channel list during channel scanning. Moreover, a method of providing information on channels unavailable for broadcast reception has not been proposed.

SUMMARY OF THE INVENTION

One embodiment of the present invention is to provide a mobile terminal which includes a wireless communication unit configured to receive channel information and scan at least one channel; a controller configured to generate a channel database using the received channel information and generate a channel list according to a result of real time channel scan using the channel database; and an output unit configured to display the channel list according to the result of the real time channel scan under control of the controller.

In an aspect of the present invention, the channel information includes channel identification information or a frequency assigned to the at least one channel. Preferably, the channel information is related to a specific area in which the mobile terminal is located.

Preferably, the wireless communication unit receives the channel information if it is determined that the channel database previously generated by the controller needs to be updated. Preferably, the wireless communication unit receives relevant broadcast information and the controller generates the channel database by matching the received relevant broadcast information to the channel information.

In an aspect of the present invention, the controller generates the channel database by reflecting at least one of a channel supported in a specific area, a channel assigned to a frequency, a channel scan result, a channel genre, viewer age discretion information for a channel, presence or absence of a preferred channel, an audience rating, or broadcast schedule information. Preferably, the at least one channel is sorted in accordance with a reference using the generated channel database under control of the controller. Preferably, the at least one channel is selected from the channel list under control of the controller.

In an aspect of the invention, the wireless communication unit scans at least one channel available in a second area under control of the controller if the mobile terminal moves into the second area from a first area. Preferably, the wireless communication unit scans a channel used for a broadcast in a first area among at least one or more channels available in a second area and the output unit outputs a broadcast signal provided from the scanned channel without interruption under control of the controller if the mobile terminal moves to the second area from the first area while outputting the broadcast. Preferably, the channel list includes at least one of reception availability, reception strength, or broadcast schedule information for each channel in the channel list.

In an aspect of the present invention, the output unit outputs a broadcast signal provided from a selected reception-available channel and the wireless communication unit scans the at least one channel selectively while outputting the broadcast signal under control of the controller when the reception-available channel is selected from the displayed channel list during a channel scan. Alternatively, the output unit outputs a broadcast signal provided from a selected reception-available channel by switching from a channel outputting the broadcast to the selected reception-available channel when the reception-available channel is selected from the displayed channel list while outputting a broadcast.

In an aspect of the present invention, the controller searches identification information on a specific program to find a matching channel in a second area and reschedules at least recording or viewing for the specific program when the mobile terminal moves to the second area from the first area after scheduling the at least recording or viewing for the specific program in the first area and the search for the matching channel is performed using the channel database and the rescheduling is performed by replacing a channel previously assigned to the specific program in the first area with the matching channel assigned to the specific program in the second area using the searched identification information.

Another embodiment of the present invention is to provide a method of scanning channels in a mobile terminal and the method includes receiving channel information; generating a channel database using the received channel information; scanning at least one channel; and displaying a channel list generated using the channel database by reflecting a result of real time channel scanning.

In an aspect of the present invention, the method also includes receiving relevant broadcast information and the channel database is generated by matching the received relevant broadcast information to the received channel information. Preferably, generating the channel database includes reflecting at least one of a channel supported in an area, a channel assigned to a frequency, a channel scanning result, a channel genre, viewer age discretion information for a channel, presence or absence of a preferred channel, an audience rating, or broadcast schedule information.

In an aspect of the present invention, the method may also include sorting the at least one channel in accordance with a reference using the generated channel database and selecting the at least one channel from the displayed channel list. The method may further include scanning a channel used in a first area among at least one or more channels available in a second area and outputting a broadcast signal provided from the scanned channel if the mobile terminal moves to the second area from the first area while outputting a broadcast.

In an aspect of the present invention, the method may further include selecting a reception-available channel from the displayed channel list while scanning the at least one channel; and outputting a broadcast signal provided from the selected reception-available channel, wherein the at least one channel is scanned selectively depending on whether a scanning operation is to be maintained.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
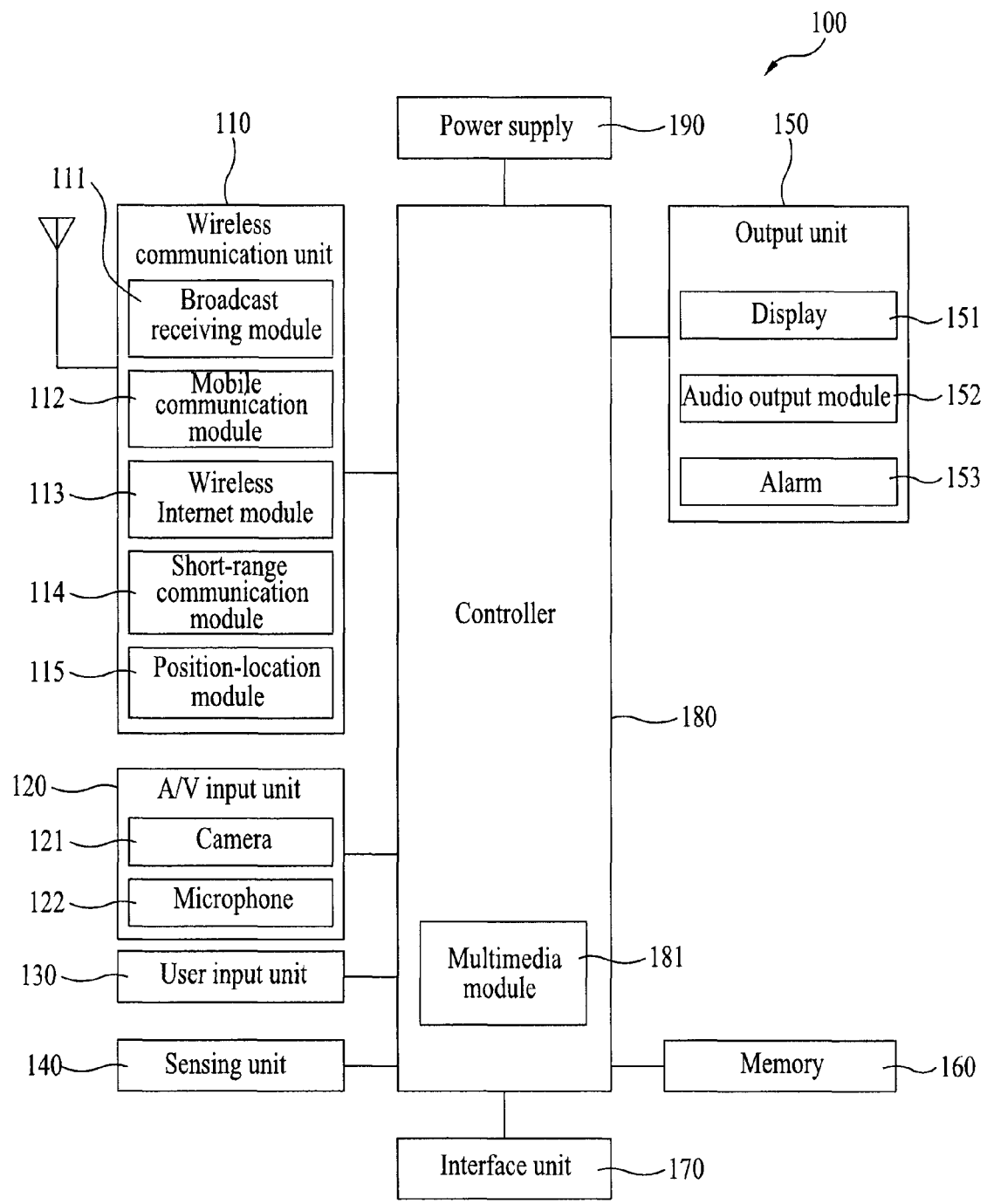
FIG. 1 is a block diagram of a mobile terminal according to an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP), and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components may not be required and greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity generally refers to a system which transmits a broadcast signal and/or broadcast associated information.

Examples of the broadcast associated information include information associated with a broadcast channel, a broadcast program, and a broadcast service provider. For example, the broadcast associated information may include an electronic program guide (EPG) of digital multimedia broadcasting (DMB) or an electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as a memory 160.

The mobile communication module 112 communicates wireless signals with one or more network entities, such as a base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access).

The short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as BLUETOOTH® and Zigbee®.

The position-location module 115 identifies or otherwise obtains the location of the mobile terminal 100. The position-location module 115 may be implemented using global positioning system (GPS) components which cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video. The microphone 122 receives an external audio signal while the portable device is in a particular mode, such as phone call mode, recording mode or voice recognition mode. This audio signal is processed and converted into digital data.

The mobile terminal 100 and specifically the A/V input unit 120 may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones 122 and/or cameras 121 may be used.

The user input unit 130 generates input data responsive to user manipulation of an associated input device or devices. Examples of such devices include a keypad, a dome switch, a touchpad such as a static pressure/capacitance, a jog wheel and a jog switch. A specific example is a user input unit 130 configured as a touchpad in cooperation with a touch screen display, which will be described in more detail below.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, or the orientation or acceleration/deceleration of the mobile terminal.

The sensing unit 140 may sense whether a sliding portion of the mobile terminal 100 is open or closed if the mobile terminal is configured as a slide-type mobile terminal. The sensing unit 140 may also sense the presence or absence of power provided by the power supply 190, and the presence or absence of a coupling or other connection between the interface unit 170 and an external device.

The interface unit 170 may be implemented to couple the mobile terminal 100 with external devices. Typical external devices include wired/wireless headphones, external chargers, power supplies, earphones, microphones and storage devices configured to store data such as audio, video, and pictures, earphones, and microphones. The interface unit 170 may be configured using a wired/wireless data port, audio input/output ports, video input/output ports, or a card socket for coupling to a memory card, a subscriber identity module (SIM) card, a user identity module (UIM) card, or a removable user identity module (RUIM) card.

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of the output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage device.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
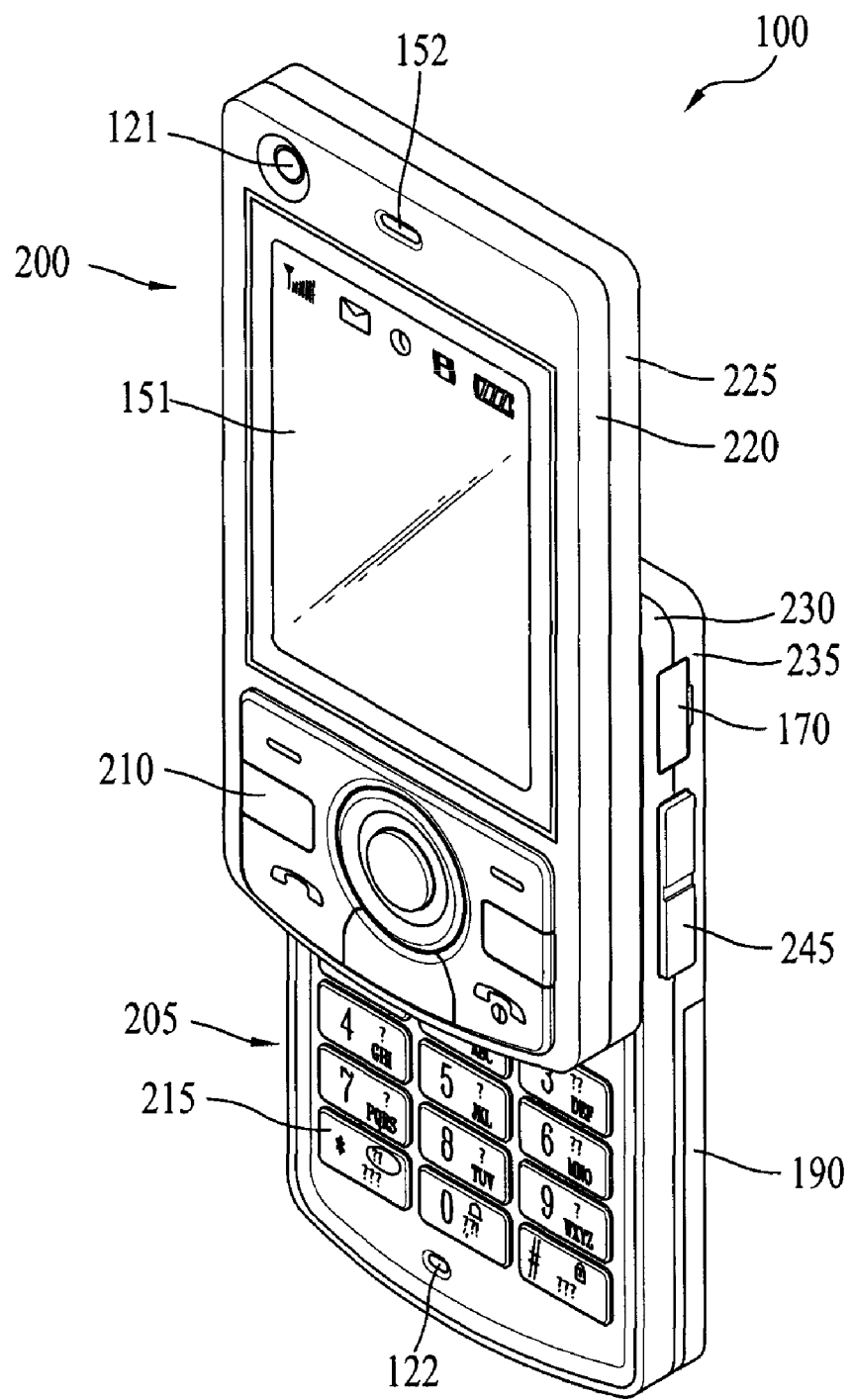
FIG. 2 is a perspective view of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The first cases 220, 230 and second cases 205, 235 are usually formed of a suitably rigid material, such as injection molded plastic, or formed using metallic material, such as stainless steel (STS) and titanium (Ti).

One or more intermediate cases may be provided between the first case 225 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit 130, positioned along the side of second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
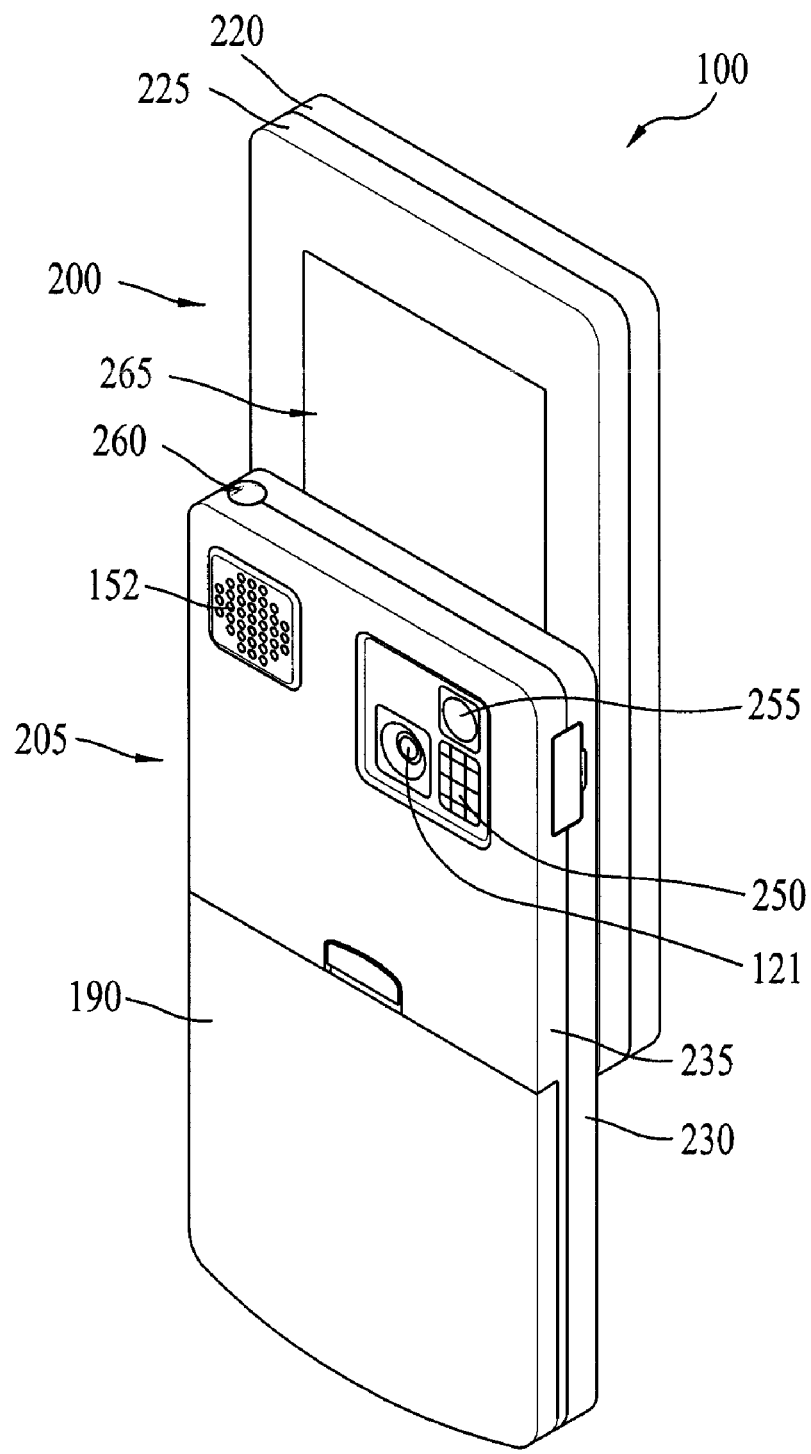
FIG. 3 is a rear view of the mobile terminal shown in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a video conference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may alternatively be implemented on the other body. Further, the location and relative positioning of the components are not critical and, therefore, the components may be positioned at locations which differ from those shown in FIGS. 2 and 3.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
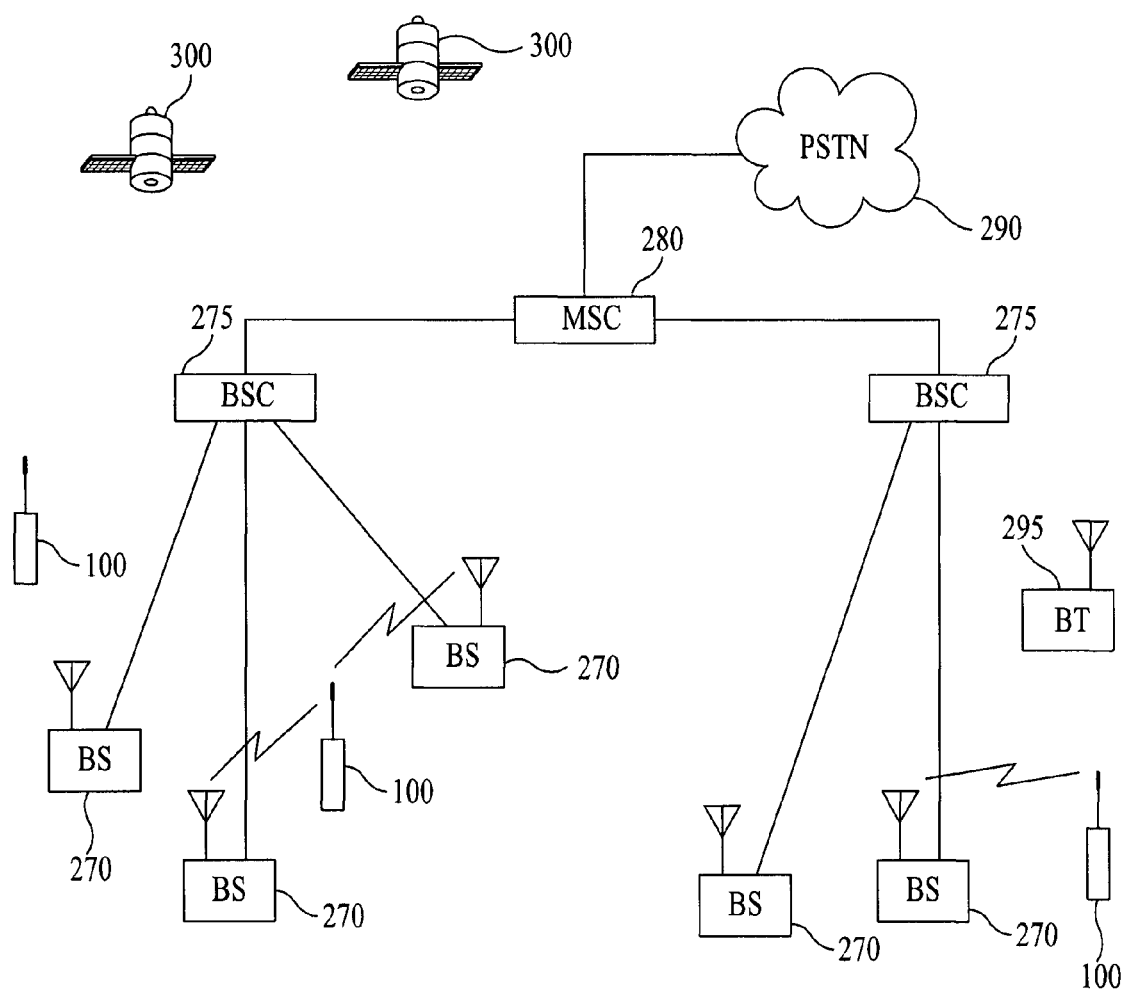
FIG. 4 is a block diagram of a CDMA wireless communication system operable with the mobile terminal of FIGS. 1 to 3.

Referring to FIG. 4, a CDMA wireless communication system is shown having a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is shown broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the mobile terminals 100. Two satellites 300 are depicted, but it is understood that useful positioning information may be obtained with greater or fewer satellites.

The position-location module 115 illustrated in FIG. 1 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

In the following description, steps of a channel scanning method in a mobile terminal according to the present invention are explained with reference to FIG. 5. For clarity and convenience of description, it is assumed that the mobile terminal mentioned in the following description includes at least one of the components shown in FIG. 1. Further, it is assumed that movement of the mobile terminal 100 includes an inter-country move and a local move within the same country.

Figure 5:
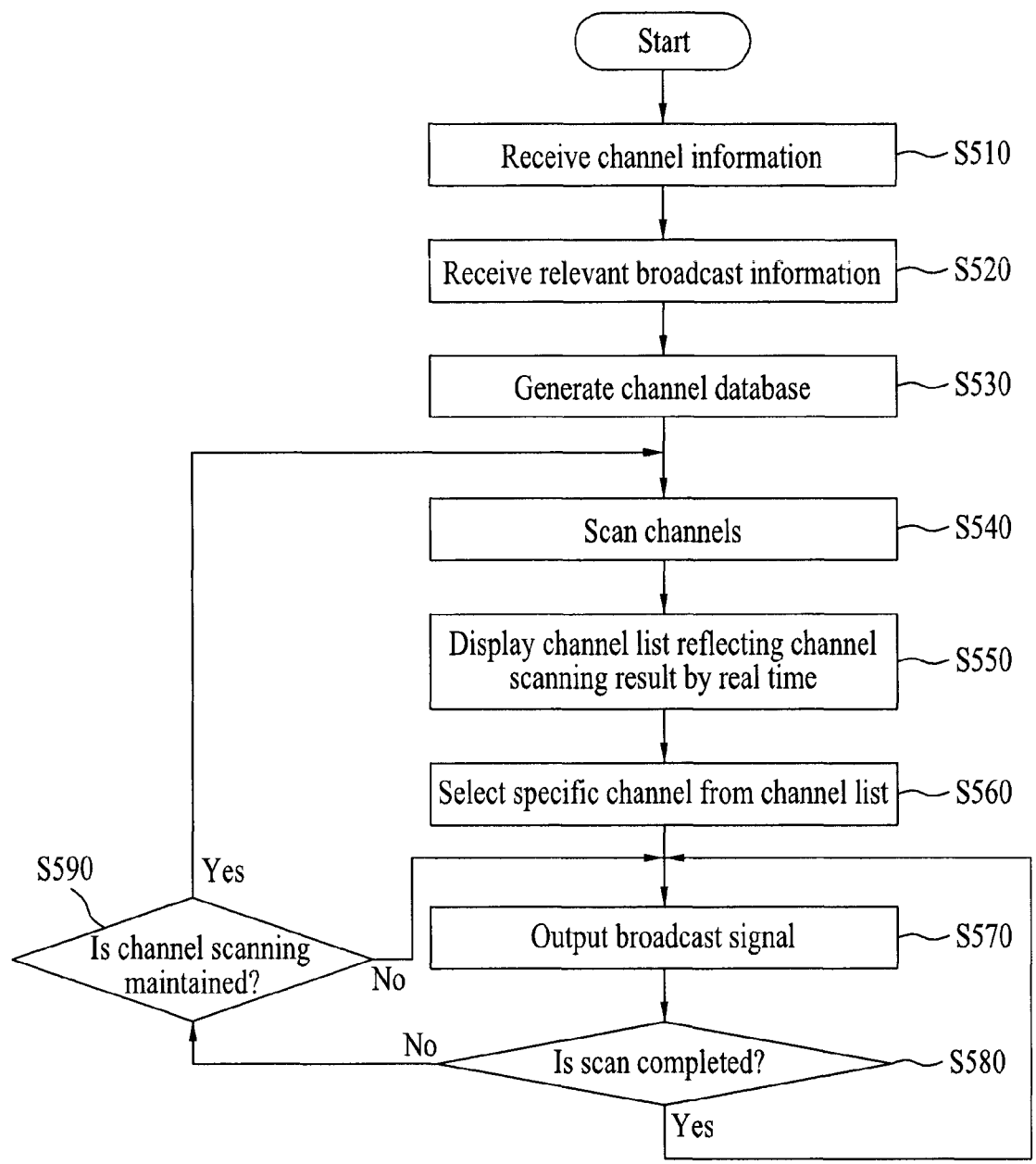
FIG. 5 is a flowchart illustrating a channel scanning method of a mobile terminal according to one embodiment of the present invention.

Referring to FIG. 5, the mobile terminal 100 receives channel information from an external server via the wireless communication unit 110 (S510). The channel information may include available area information for each channel, frequency information assigned to each channel, and channel identification information, such as a channel name, a channel ID, and a channel assignment number. The external server may provide the channel information. The external server may be provided separately or included in a broadcast server that generates and provides a broadcast signal and broadcast information.

The mobile terminal 100 receives channel information via a broadcasting network, a mobile communication network, a data network, Internet, or a short-range communication network in order to receive the channel information (S510). For example, the broadcast receiving module 111 receives channel information via a data or broadcast channel of the broadcasting network (S510). The mobile communication module 112 receives channel information via the mobile communication network or data network (S510). The wireless internet module 113 receives channel information via Internet and the short-range communication module 114 receives channel information via the short-range communication network (S510).

The channel information may be received (S510) periodically or randomly. A user may request to receive channel information such that the mobile terminal 100 sends a request for channel information to the external server via the wireless communication unit 110 and receives corresponding channel information from the external server (S510).

When the mobile terminal 100 is located in a specific area, the mobile terminal receives channel information (S510) regarding a channel which is supported in the specific area. The position-location module 115 recognizes its location using coordinated information provided by a satellite of GPS system or network or base station position information.

When the mobile terminal 100 is moved to a different location or area, the mobile terminal determines whether the terminal has entered a new area, which is different from the previous area and supports different channels, and receives channel information (S510). The mobile terminal 100 stores channel information regarding previous channels, which were supported in the previous area before entering the new area in the memory 160 and determines whether the previous channels are also supported in the newly entered area.

Alternatively, the mobile terminal 100 may store the channel information in advance. If it is determined that the channel information stored in the memory 160 in advance needs to be updated, the mobile terminal 100 receives channel information (S510). For example, the channel information may be received (S510) in the following situations: when channel information regarding a channel available in first to fifth areas is stored in advance, when an area other than the first to fifth areas is newly entered, when a new channel, which is different from a channel corresponding to the previously stored channel information, is supported in a random area, when the previously stored channel information is changed, and when a user selects to update the channel information.

The mobile terminal 100 may store the received channel information in the memory 160. Since the mobile terminal 100 stores the channel information on channels supported in the location or area previously entered at least once, the mobile terminal may not receive the channel information (S510) if the previously entered location or area is re-entered.

After receiving the channel information (S510), the mobile terminal 100 receives relevant broadcast information via the wireless communication unit 110 (S520). The relevant broadcast information is information that is relevant to a broadcast program provided via a channel. The relevant broadcast information may include at least one of channel identification information, broadcast program identification information, broadcast program broadcast time information, information on an interactive service interconnected to the broadcast program or broadcast program content information, such as a title, a synopsis, a preview broadcast, and character information. The relevant broadcast information may be provided in a format of an electronic program guide (EPG), an interactive program guide (IPG), or an electronic service guide (ESG).

If it is determined that the mobile terminal 100 is located in a specific area by the position-location module 115, the mobile terminal receives relevant broadcast information regarding channels supported in the specific area. Then, the mobile terminal 100 generates a channel database (S530) using the received channel information to provide a user with stored relevant channel information. Specifically, the mobile terminal 100 generates the channel database (S530) by matching the relevant received broadcast information to the received channel information.

The mobile terminal 100 generates the channel database (S530) by reflecting at least one of a channel supported in a specific area, a channel assigned to a frequency, a channel scanning result, a channel genre, a viewer age discretion information of a channel, presence or absence of a preferred channel, an audience rating, and broadcast schedule information. The channel supported in the specific area and the channel assigned to the frequency may be obtained from the channel information. The channel scanning result and the presence or absence of the preferred channel may be obtained from a scanning operation and a broadcast viewing operation, respectively. The channel genre, the viewer age discretion information of the channel, and the broadcast schedule may be obtained from the relevant broadcast information. The audience rating generated per channel or broadcast program may be separately provided from the external server.

The channel database is stored in the memory 160 and if at least one of the channel information, an operational pattern of the mobile terminal 100 and the relevant broadcast information is changed, the channel database may be updated automatically or upon a user's request.

The mobile terminal 100 scans one or more channels using the wireless communication unit 110 (S540). The mobile terminal 100 performs a channel scanning operation via the broadcast receiving module 111.

The mobile terminal 100 displays a channel list generated using the generated channel database via the output unit 150, specifically, via the display 151 (S550). The mobile terminal 100 displays the channel list according to a real-time scan result of the scanned channels (S550).

Alternatively, the mobile terminal 100 may scan the channels (S540) and the display the channel list (S550) simultaneously. Therefore, while the scanning is in progress, a user may confirm a scan result of a scanned channel. Further, the user may also confirm channel information, such as a channel name, on a channel not yet scanned via the channel list.

When scanning channels (S540), the mobile terminal 100 may scan at least one channel sorted in accordance with a prescribed reference using the relevant generated channel information. For example, the mobile terminal 100 extracts the channel database in accordance with a sorting reference directly input by the user, or in accordance with a default sorting reference and then scans at least one channel corresponding to the extracted channel database.

If it is determined that the mobile terminal 100 has moved into a second area from a first area by the position-location module 115, the mobile terminal scans for a channel supported in the second area. If a channel supported in the first area and the channel supported in the second area differ from each other, the mobile terminal 100 scans the channel supported in the second area.

If it is determined that the mobile terminal 100 has moved into a second area from a first area by the position-location module 115 while outputting a broadcast via the output unit 150, the mobile terminal scans a channel providing the same broadcast channel as in the first area among at least one or more channels supported in the second area. The mobile terminal 100 then outputs a broadcast via the output unit 150 based on a signal output from the scanned channel. Accordingly, the user views the broadcast provided from a specific channel without any interruption even if the mobile terminal 100 has moved to an area in which supported channels are different from supported channels in the previous area.

When displaying the channel list (S550), the mobile terminal 100 displays a channel list including at least one of reception availability per channel, reception strength per channel, and broadcast schedule information per channel according to the scanning result.

The mobile terminal 100 scans at least one channel selected from the displayed channel list (S560). For example, a user selects a specific channel to be scanned, for example, a reception-unavailable channel, a reception-available channel, or a reception-available/unavailable channel (S560).

Figure 6A:
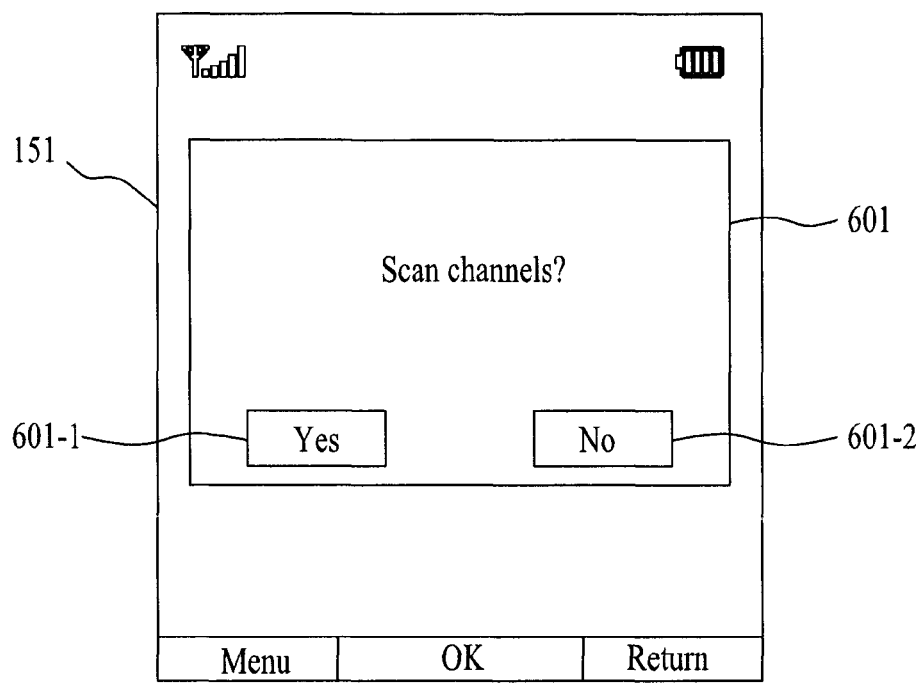
FIGS. 6A to 6J illustrate screens of a process of executing a channel scanning operation in a mobile terminal according to one embodiment of the present invention.
Figure 6A:
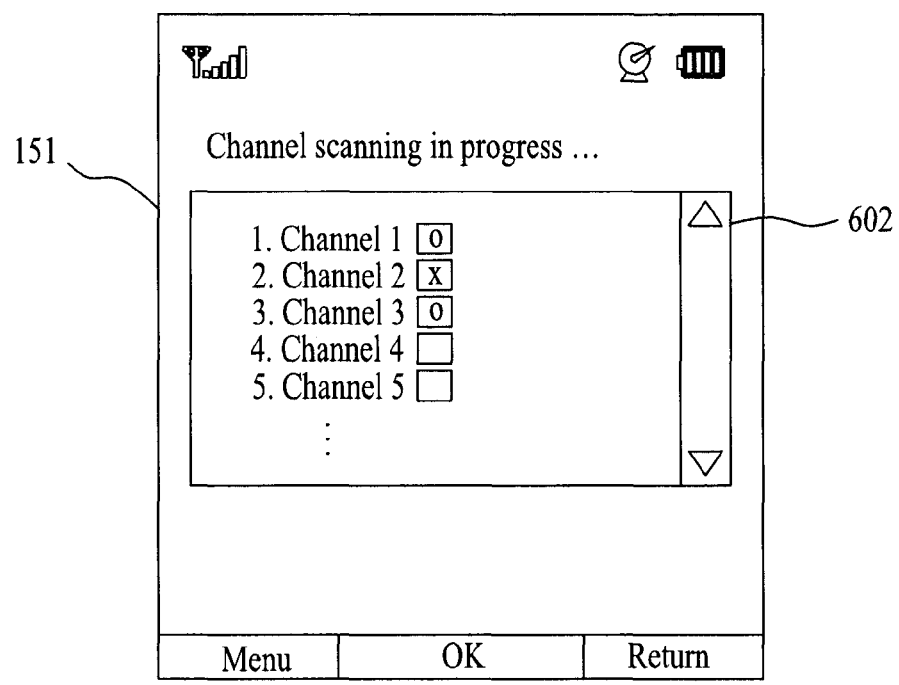

The channel scan (S540) and channel list display (S550) are explained in detail with reference to FIGS. 6A to 6J. Referring to FIG. 6A, the mobile terminal 100 performs a scanning operation on all channels in response to a user's request or selection for a channel scanning as exemplified by 'Yes' 601-1 in FIG. 6A(a). Then, the mobile terminal 100 displays a channel list 602 indicating availability of reception as "O" or "X" in accordance with a scanning result as shown in FIG. 6A(b), where "O" indicates that reception is available and "X" indicates that reception is not available, for example.

Assuming that scanning is sequentially carried out beginning from Channel 1, the mobile terminal 100 displays reception availability for Channel 1 according to a scanning result of Channel 1, displays reception availability for Channel 2 according to a scanning result of Channel 2, and so on until displaying reception availability for the last scanned channel after stopping the scanning operation after scanning the last channel.

Figure 6B:
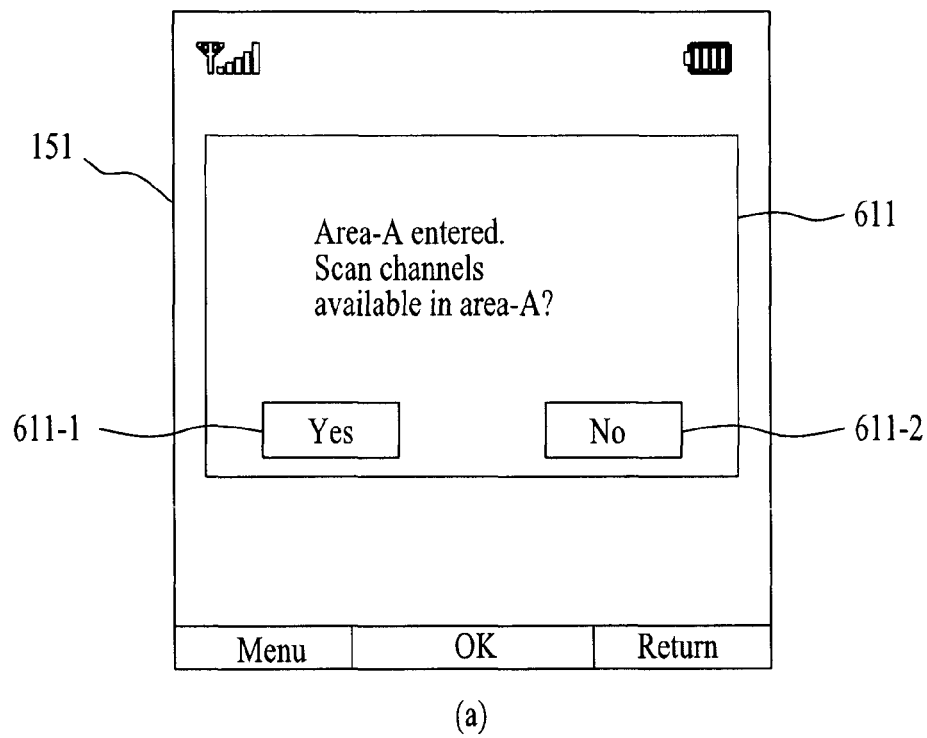
Figure 6B:
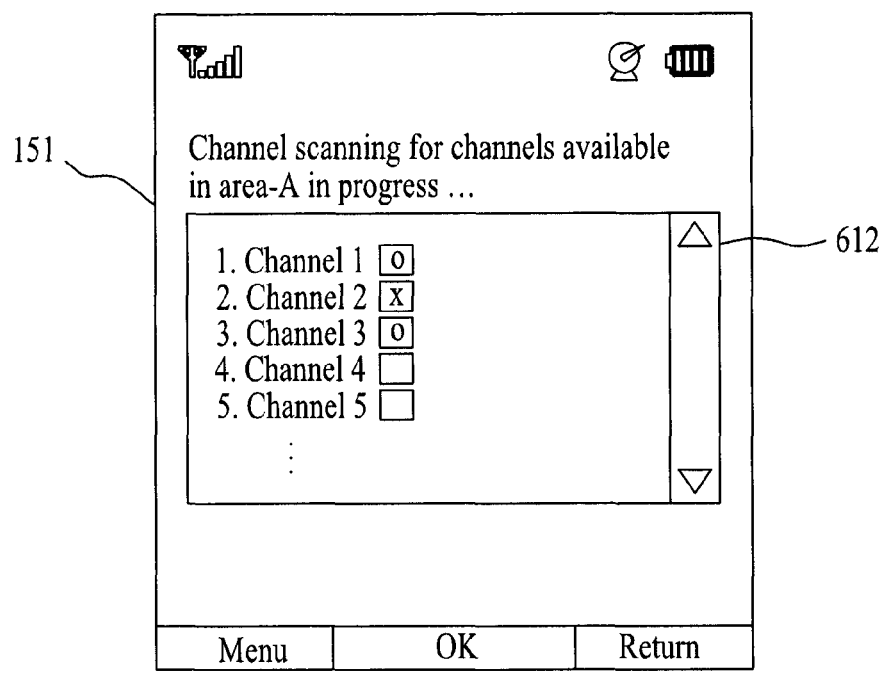

Referring to FIG. 6B, the mobile terminal 100 displays a window 611 for querying whether to scan channels to detect channels that are supported in the specific area, as shown in FIG. 6B(a), if it is determined that the mobile terminal entered a specific area, for example, "area-A." The mobile terminal 100 displays a channel list 612 showing channels supported in the specific area and indicating reception availability for each channel according to a real time channel scanning result, as shown in FIG. 6B(b), if 'Yes' 611-1 is selected in FIG. 6B(a).

Figure 6C:
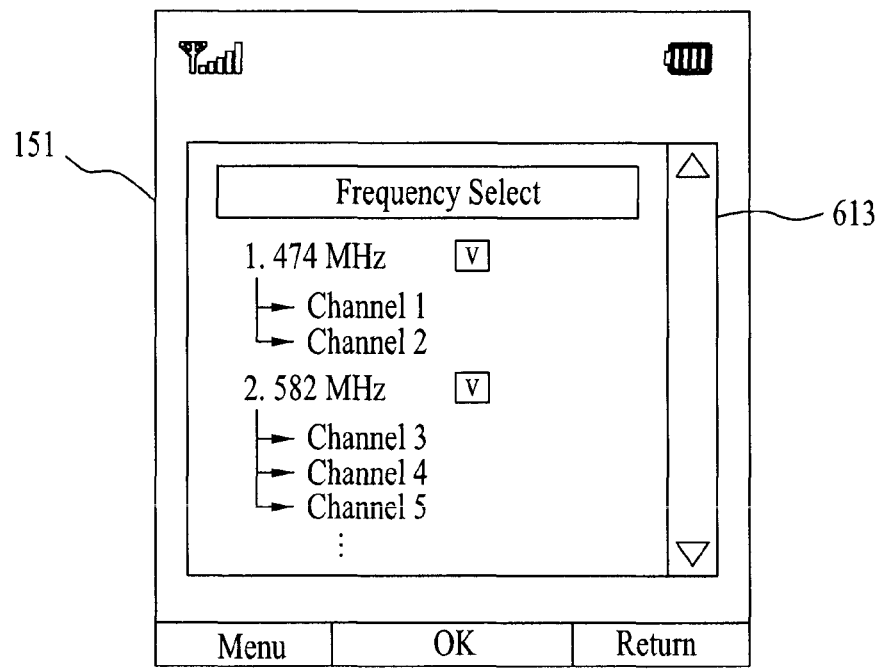
Figure 6C:
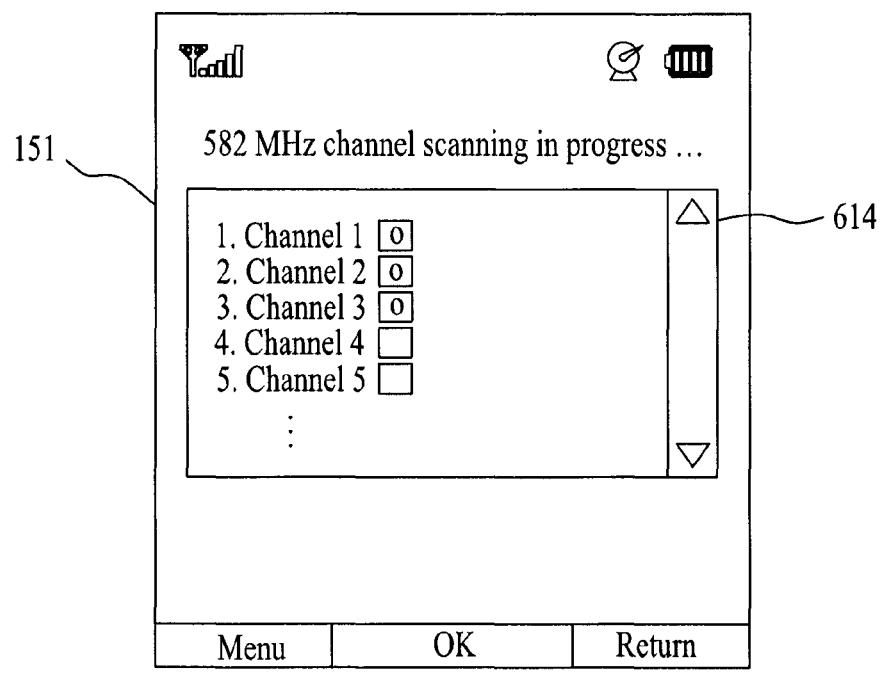

Referring to FIG. 6C, the mobile terminal 100 displays a "Frequency Select" list 613 showing a plurality of frequencies to be selected for scanning, at least one channel being assigned to each of the plurality of frequencies, as shown in FIG. 6C(a). The mobile terminal 100 displays a channel list 614 showing channels corresponding to a selected at least one frequency and indicating reception availability for each channel in the channel list 614 according to a real time channel scanning result in the order of the scanning, as shown in FIG. 6C(b) when at least one frequency is selected from the list 613.

Figure 6D:
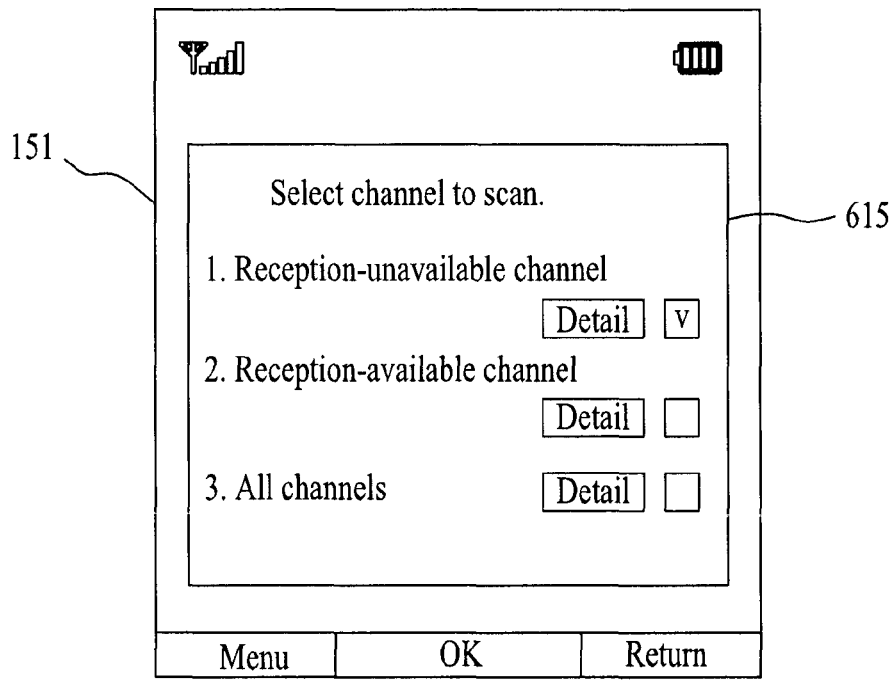
Figure 6D:
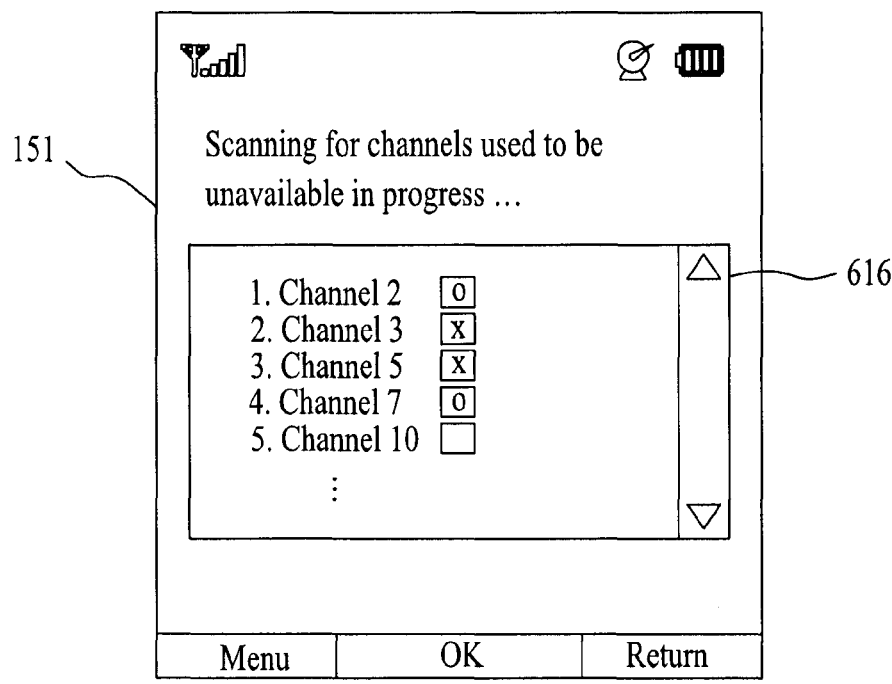

Referring to FIG. 6D, the mobile terminal 100 displays a scanning condition list 615 showing 'reception-unavailable channel', 'reception-available channel' and 'all channels' generated from the previous scanning result, as shown in FIG. 6D(a). The mobile terminal 100 displays a channel list showing channels corresponding to the selected scanning condition if 'detail' displayed next to each scanning condition is selected in FIG. 6D(a). The mobile terminal 100 displays a channel list 616 showing channels, for which reception is unavailable according to the previous scanning result and indicating reception availability for each channel in the channel list according to a real time scanning result in the order of the scanning, as shown in FIG. 6D(b), if 'reception-unavailable channel' is selected as shown in FIG. 6D(a).

Figure 6E:
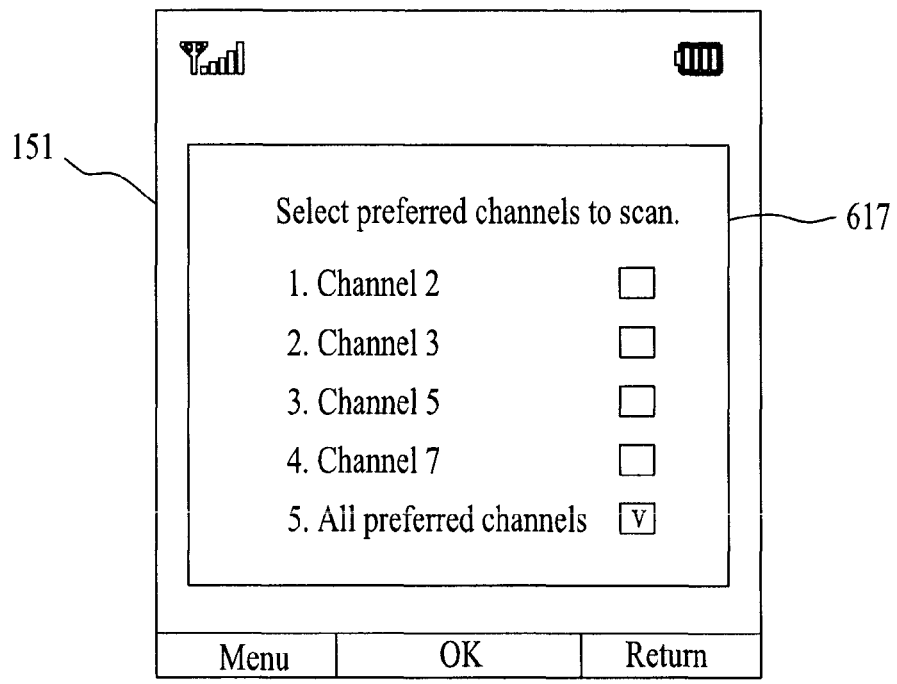
Figure 6E:
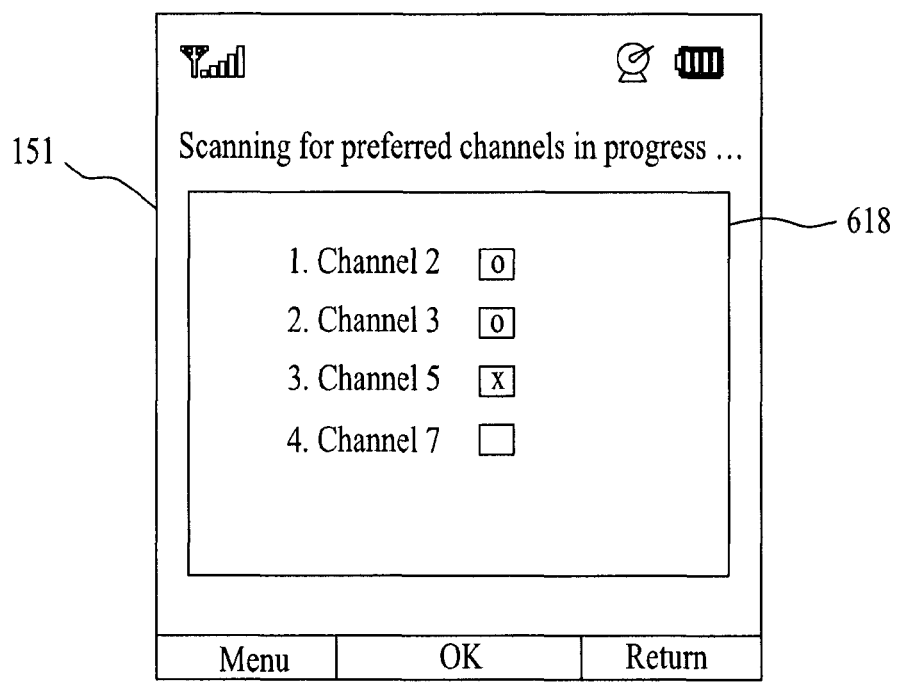

Referring to FIG. 6E, the mobile terminal 100 displays a preferred channel list 617 showing a plurality of preferred channels, as shown in FIG. 6E(a). The preferred channels are channels having a high frequency of viewing or a long viewing time which is longer than a predetermined duration of time in the mobile terminal 100. The mobile terminal 100 displays a preferred channel list 618 showing all preferred channels and indicating reception availability for each channel in the channel list according to a real time scanning result in the order of the scanning, as shown in FIG. 6E(b), if 'all preferred channels' is selected as shown in FIG. 6E(a).

Figure 6F:
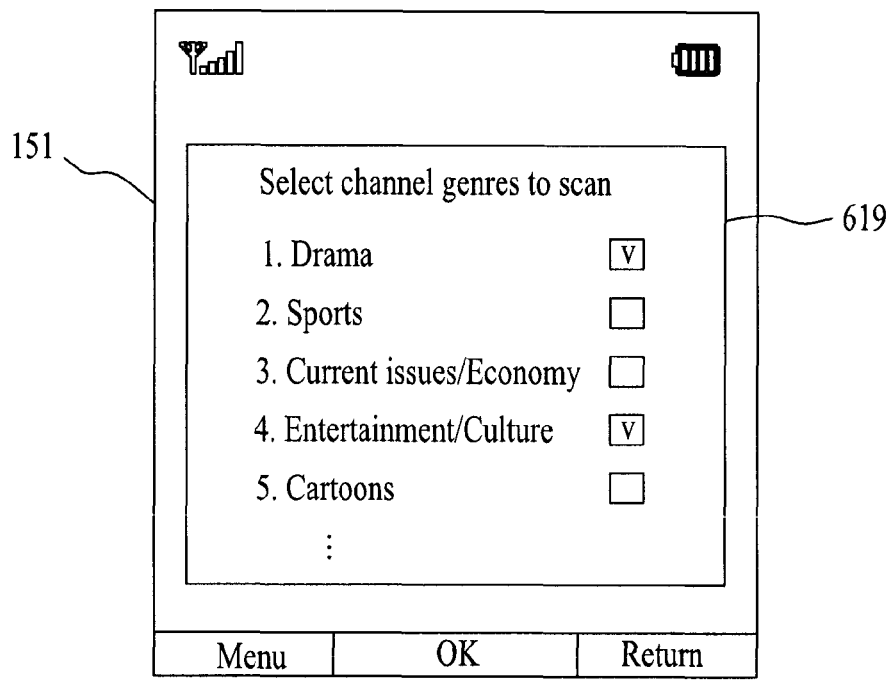
Figure 6F:
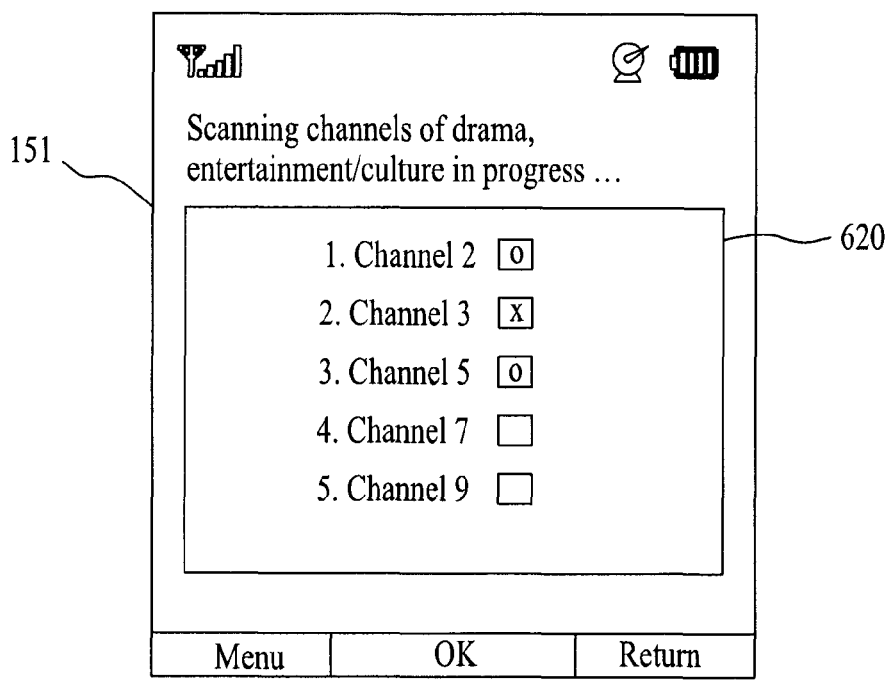

Referring to FIG. 6F, the mobile terminal 100 displays a genre list 619 showing a plurality of channel genres as shown in FIG. 6F(a). The channel genres may include drama, sports, current issues/economy, entertainment/culture, or cartoon. The mobile terminal 100 displays a channel list 620 showing channels providing the selected channel genre of drama and entertainment/culture and indicating reception availability for each channel in the channel list according to a real time scanning result in the order of the scanning, as shown in FIG. 6F(b), if 'drama' and 'entertainment/culture' are selected as shown in FIG. 6F(a).

Figure 6G:
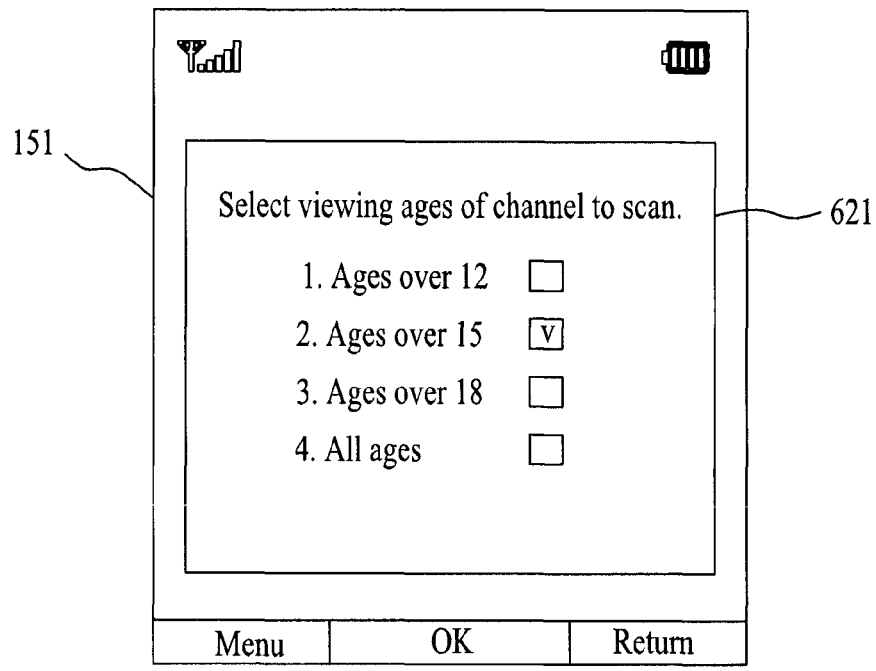
Figure 6G:
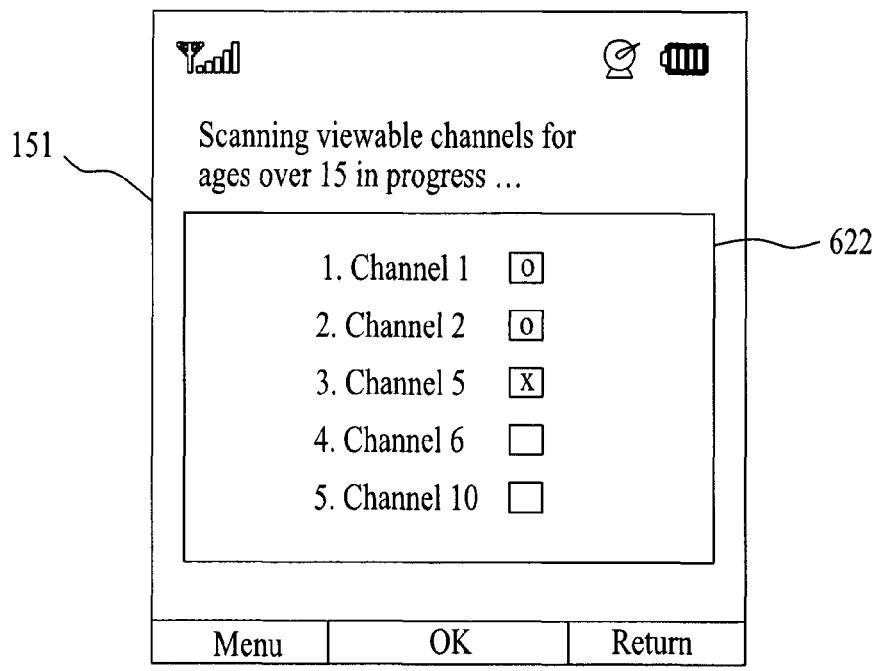

Referring to FIG. 6G, the mobile terminal 100 displays a viewer age discretion list 621 showing a plurality of ranges of viewer ages, as shown in FIG. 6G(a). The mobile terminal 100 displays a channel list 622 showing channels viewable by viewers of ages over 15 and indicating reception availability for each channel in the channel list according to a real time scanning result in the order of the scanning, as shown in FIG. 6G(b), if 'ages over 15' is selected as shown in FIG. 6G(a).

Figure 6H:
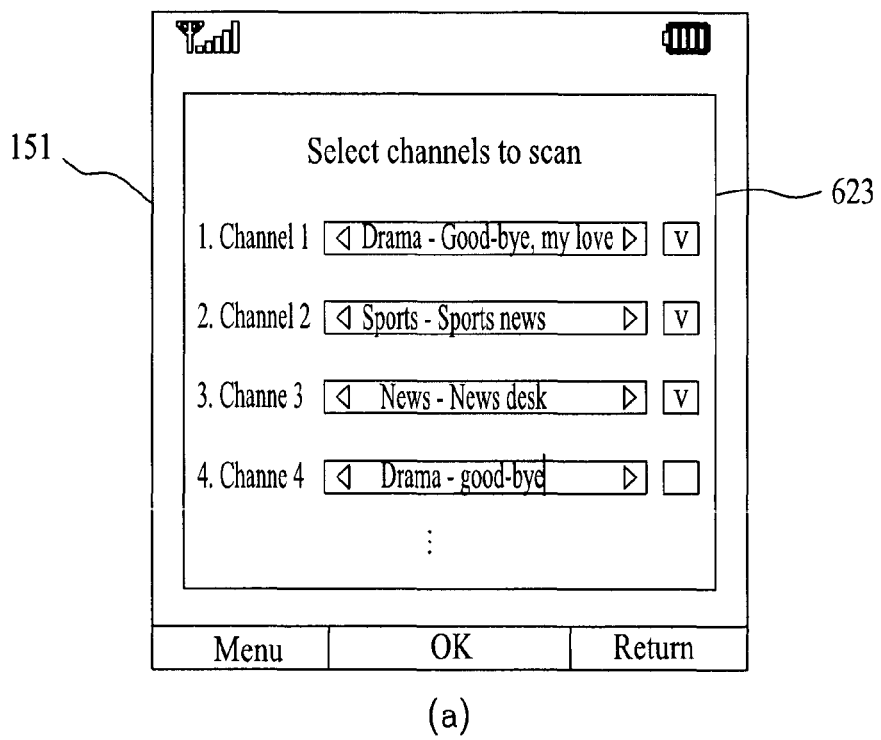
Figure 6H:
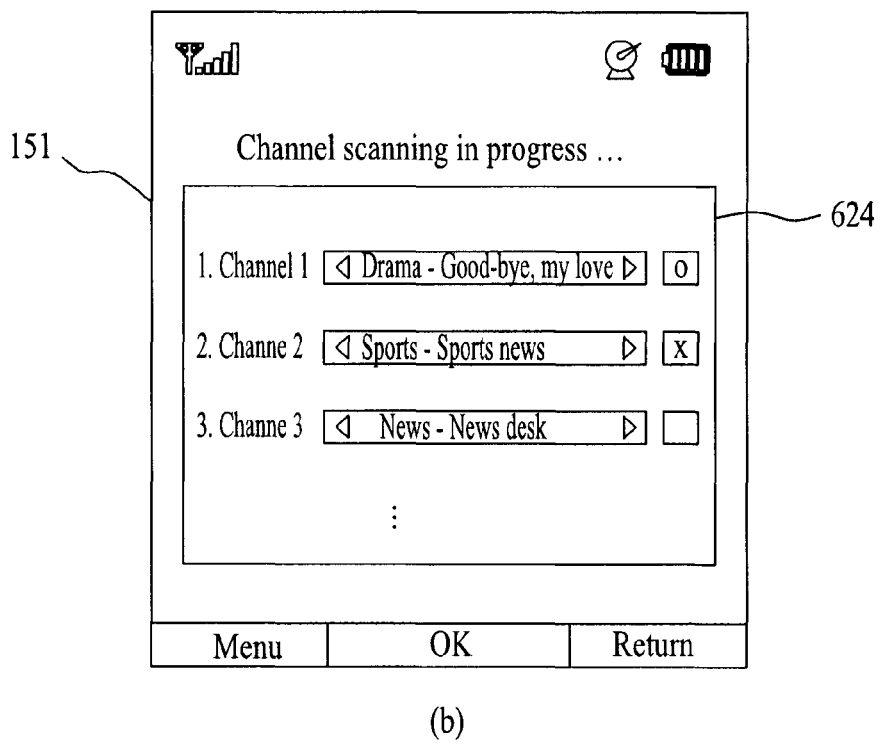

Referring to FIG. 6H, the mobile terminal 100 displays a list 623 that shows broadcast program information for each channel as shown in FIG. 6H(a). The broadcast program information may include a program title currently being broadcast by a corresponding channel and a previous/next program title. The broadcast program information may also include broadcast schedule information corresponding to each channel.

The mobile terminal 100 displays a channel list 624 showing the channels selected from the list 623 and indicating reception availability of each channel in the list according to a real time channel scanning result in the order of the scanning, as shown in FIG. 6H(b), if at least one channel, for example, Channels 1, 2, and 3, are selected from the list 623 as shown in FIG. 6H(a).

Figure 6I:
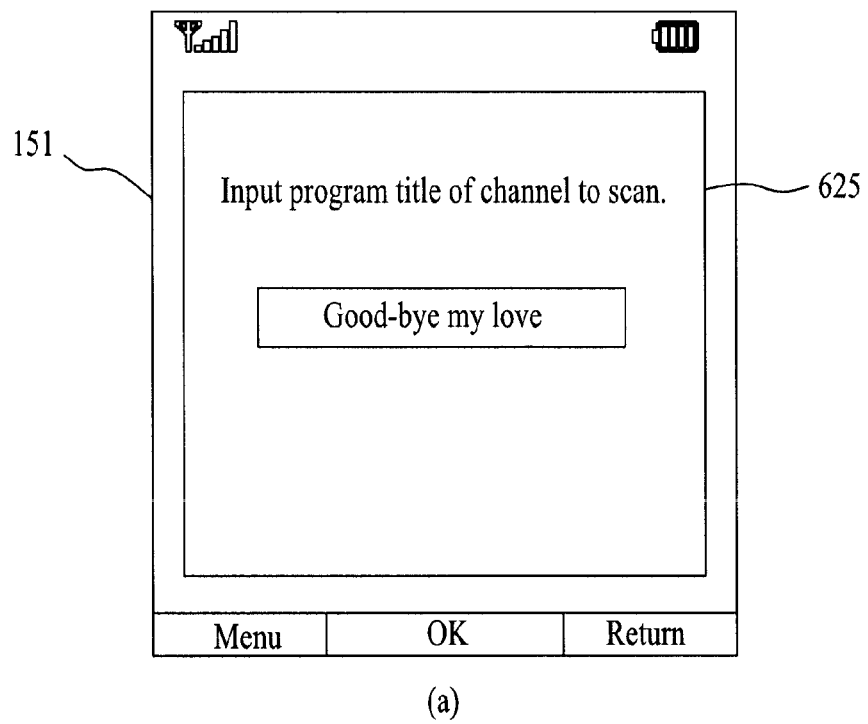
Figure 6I:
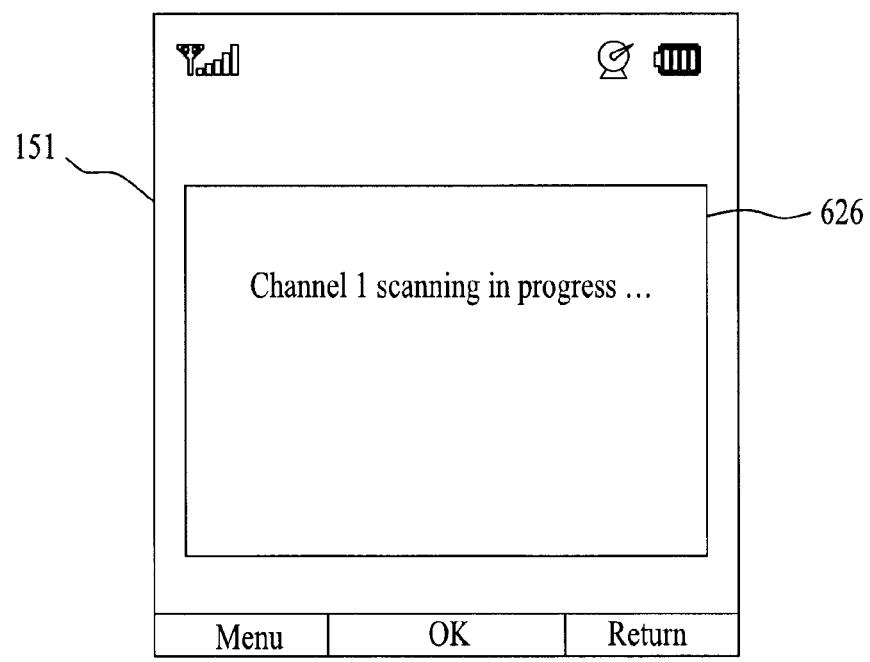

Referring to FIG. 6I, a program title of a channel to be scanned may be directly input to an input window 625 of the mobile terminal 100 by a user as shown in FIG. 6I(a). Alternative to the program title, other scanning criteria, such as a channel name and an area name may be directly input to the mobile terminal 100. Further, at least one or more program titles may be input in a plurality of input boxes on the input window 625 to scan for plurality of program titles. The mobile terminal 100 scans for a channel providing 'Good-by, my love', as shown in FIG. 6I(b), if program title 'Good-bye, my love' is selected, as shown in FIG. 6I(a).

Figure 6J:
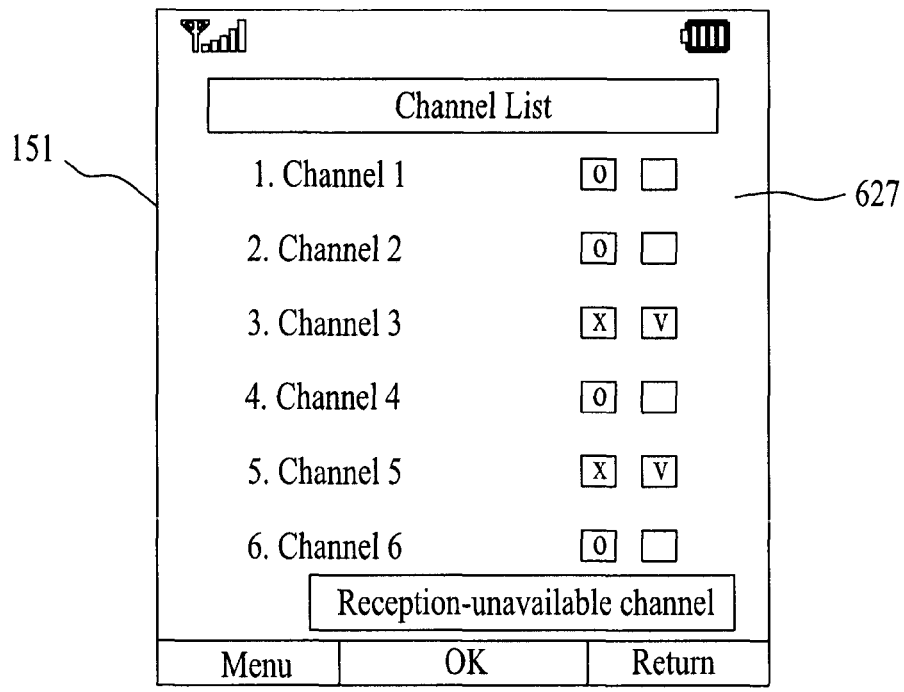
Figure 6J:
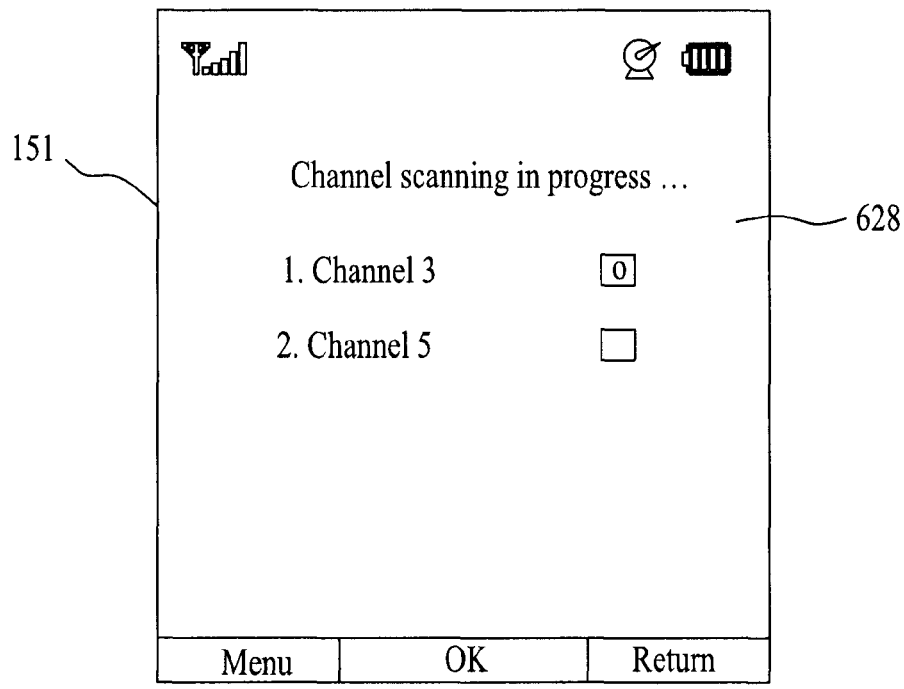

Referring to FIG. 6J, the mobile terminal 100 displays a channel list 627 showing reception availability according to the previous scanning result, as shown in FIG. 6J(a). The channel list 627 includes all channels displayed during the course of scanning or after completion of the scanning. The mobile terminal 100 displays a channel list 628 showing the reception-unavailable channels 'Channel 3' and 'Channel 5' and indicating reception availability of each reception-unavailable channel in the channel list according to a real time scanning result in the order of the scanning, as shown in FIG. 6J(b), if reception-unavailable channels 'Channel 3' and 'Channel 5,' as indicated by 'X,' are individually selected as shown in FIG. 6J(a).

Alternatively, in FIG. 6J(a), a user may select any other channel to scan, for example, reception-available channels, rather than the reception-unavailable channels. Moreover, the user may simply select the entire reception-unavailable channels by selecting a box 'reception-unavailable channel' provided at a lower right-hand portion of the channel list 627.

The channel scanning (S540) and channel list display (S550) illustrated in FIG. 5 are described in detail with reference to FIG. 7A and FIG. 7B. Specifically, FIG. 7A and FIG. 7B illustrate the channel scanning (S540) and the channel list display (S550) when the mobile terminal 100 moves into a new area.

Figure 7A:
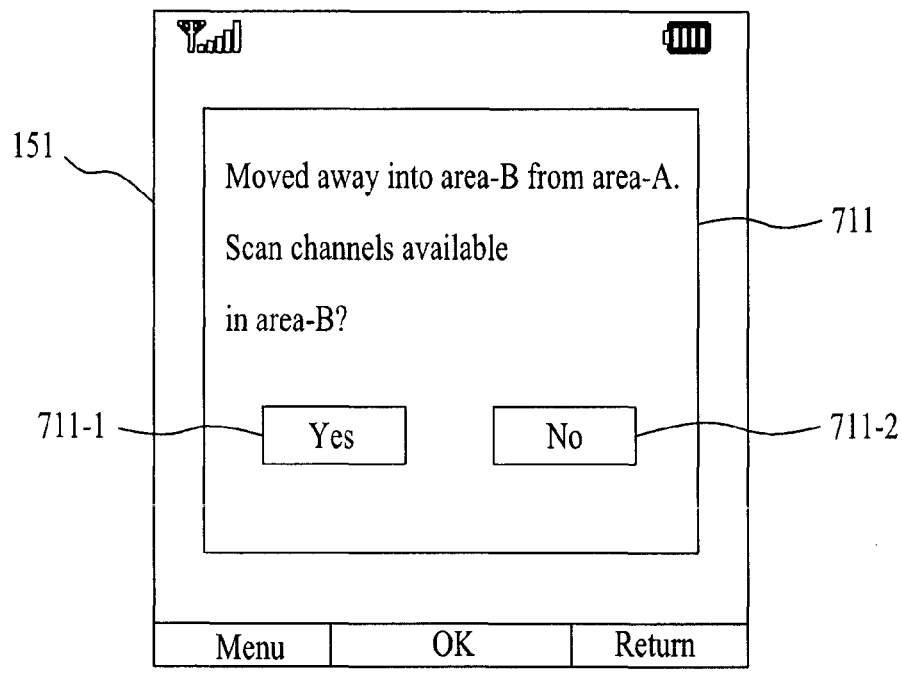
FIG. 7A and FIG. 7B illustrate screens of a process of executing a channel scanning operation in a mobile terminal according to one embodiment of the present invention when the mobile terminal moves from one area to another area.
Figure 7A:
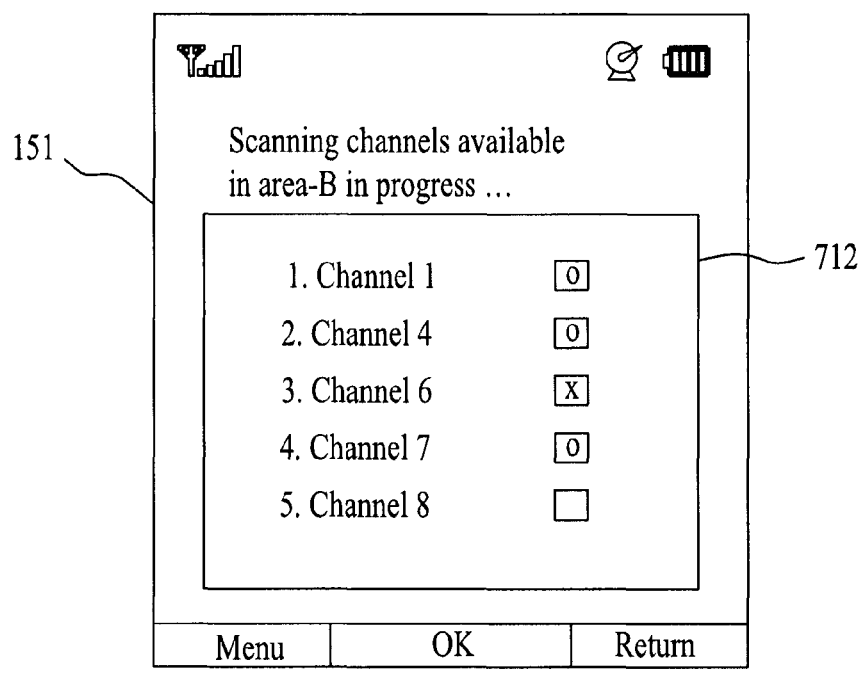

Referring to FIG. 7A, the mobile terminal displays a window 711 for querying whether channels supported or available in the area-B will be scanned, as shown in FIG. 7A(a), when it is determined by the position-location module 115 that the mobile terminal 100 moves into area-B from area-A. For example, the mobile terminal 100 will query whether to scan channels if it is determined that channels supported in area-A differ from channels supported in area-B or automatically when moving into area-B without determining whether the channels supported in area-A differ from the channels supported in area-B. The mobile terminal 100 displays a channel list 712 showing all channels supported in area-B and indicating reception availability for each channel in the channel list according to a real time channel scanning result in order of the scanning, as shown in FIG. 7A(b), if 'Yes' 711-1 is selected as shown in FIG. 7A(a).

Figure 7B:
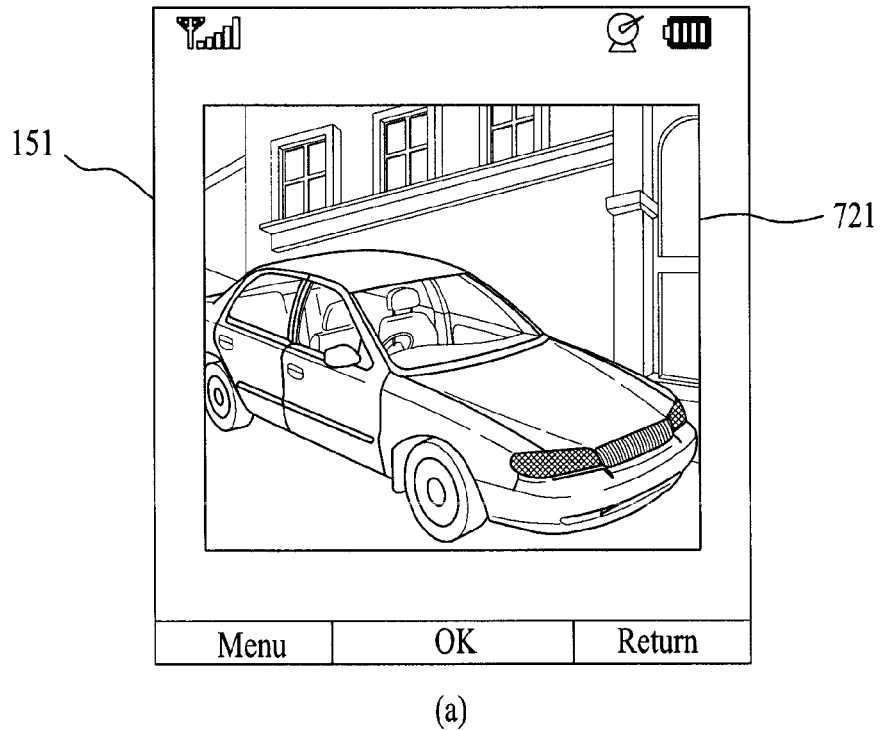
Figure 7B:
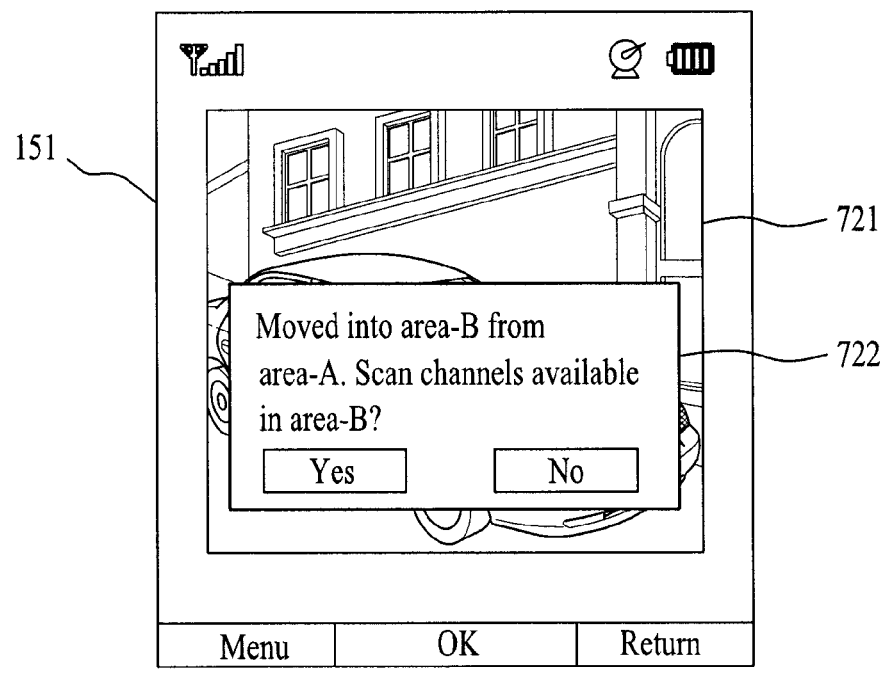

Referring to FIG. 7B, the mobile terminal 100 displays a window 722 for querying whether channels supported in area-B will be scanned, as shown in FIG. 7B(b), when movement by the mobile terminal into area-B from area-A is detected or determined while outputting a broadcast, as shown in FIG. 7A(a). The mobile terminal 100 scans for the same channel in area-B to locate a channel which provides the same broadcast signal as the channel previously output in area-A in order to output the same broadcast signal from the scanned channel, if 'Yes' is selected from the window 722. Therefore, a user continues viewing the same broadcast from the channel providing the same broadcast signal even if the area has been changed and the channels supported in the changed area are different from the channels supported in the previous area.

Figure 8A:
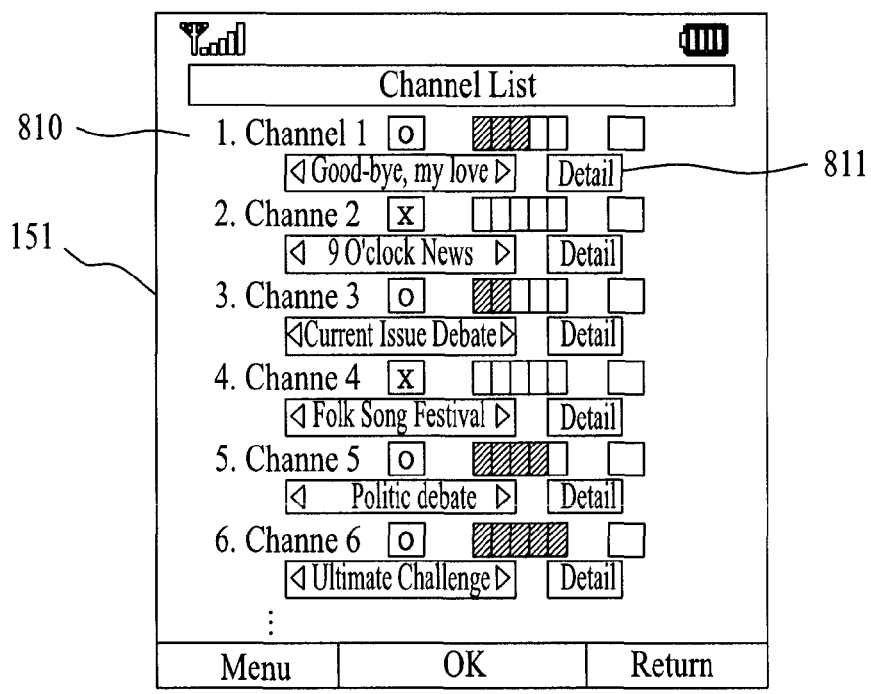
FIG. 8A and FIG. 8B illustrate screens of a process of displaying channel information and relevant broadcasting information corresponding to a channel in a mobile terminal according to one embodiment of the present invention.

The channel list display (S550) illustrated in FIG. 5 is explained in detail with reference to FIG. 8A and FIG. 8B. Referring to FIG. 8A, the mobile terminal 100 displays a channel list 810 that includes a channel name, such as Channel 1 and Channel 2, reception strength for each listed channel, and broadcast program information for each listed channel.

The reception strength may be presented by a number of bars shaded on a bar graph. The broadcast program information may be a title of a broadcast program currently provided via a channel, a title of a previously broadcasted program, or a title of a next program to be broadcast. Further, the broadcast program information may also include broadcast schedule information, as shown in FIG. 8B.

Figure 8B:
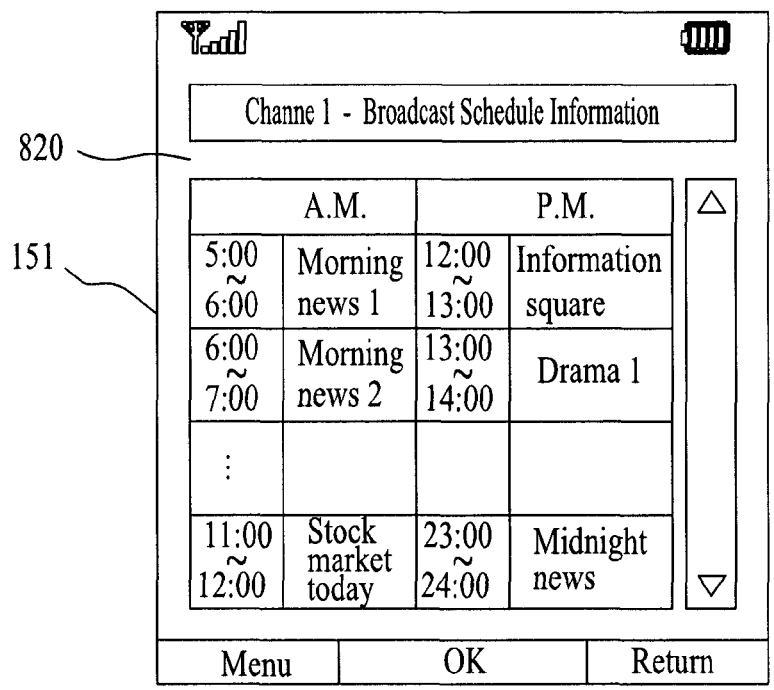

The mobile terminal 100 displays broadcast schedule information 820 on Channel 1, as shown in FIG. 8B, if 'detail' 811 of Channel 1 is selected as shown in FIG. 8A. The channel list 810 and the broadcast schedule information 820 may be carried out after completion of the channel scanning or while scanning channels.

Referring to FIG. 5 again, the mobile terminal 100 may select a specific channel for which reception is available from the displayed channel list (S560) while scanning channels. Then, the mobile terminal 100 outputs a broadcast signal received from the selected channel via the output unit 150 (S570).

The mobile terminal 100 determines whether the channel scan has been completed while outputting the broadcast signal. The mobile terminal 100 continues outputting the broadcast signal if it is determined that the channel scan has been completed. Otherwise, the mobile terminal 100 maintains the channel scan (S590).

For example, the mobile terminal 100 maintains the channel scan if a user selects to maintain the channel scan. Alternatively, the mobile terminal 100 does not maintain the channel scan if the user selects to stop the channel scan.

Figure 9A:
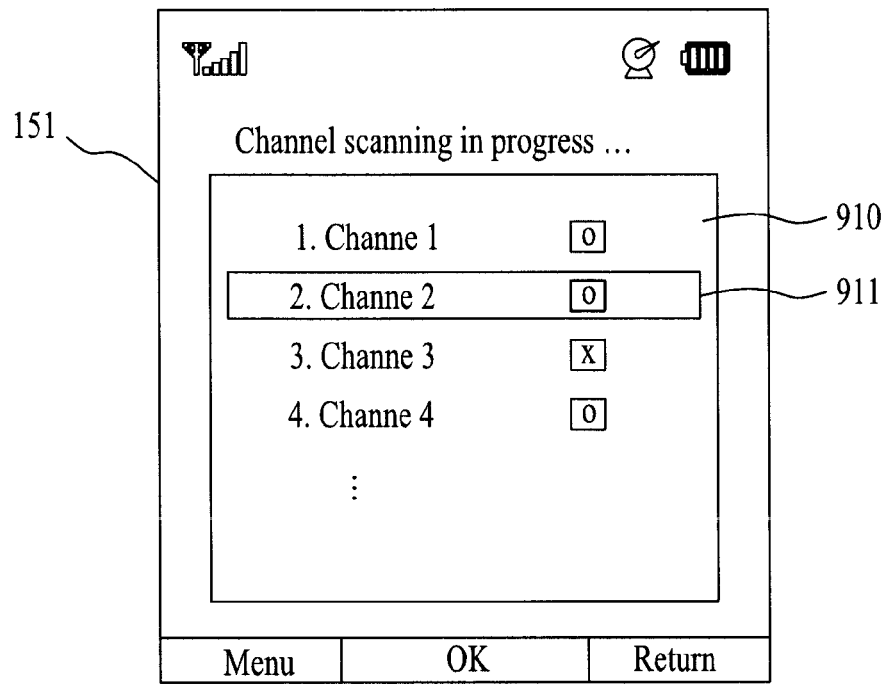
FIGS. 9A to 9D illustrate screens of a process of executing a selective channel scanning operation for broadcast output in a mobile terminal according to one embodiment of the present invention.

The broadcast signal output (S570) and the corresponding selective channel scan are described in detail with reference to FIGS. 9A to 9D. The mobile terminal 100 displays a window 921 for querying whether to maintain the channel scan while outputting a broadcast signal received on Channel 2, as shown in FIG. 9B, when reception-available channel 'Channel 2' 911 is selected from a channel list 910 while scanning channels as shown in FIG. 9A.

Figure 9B:
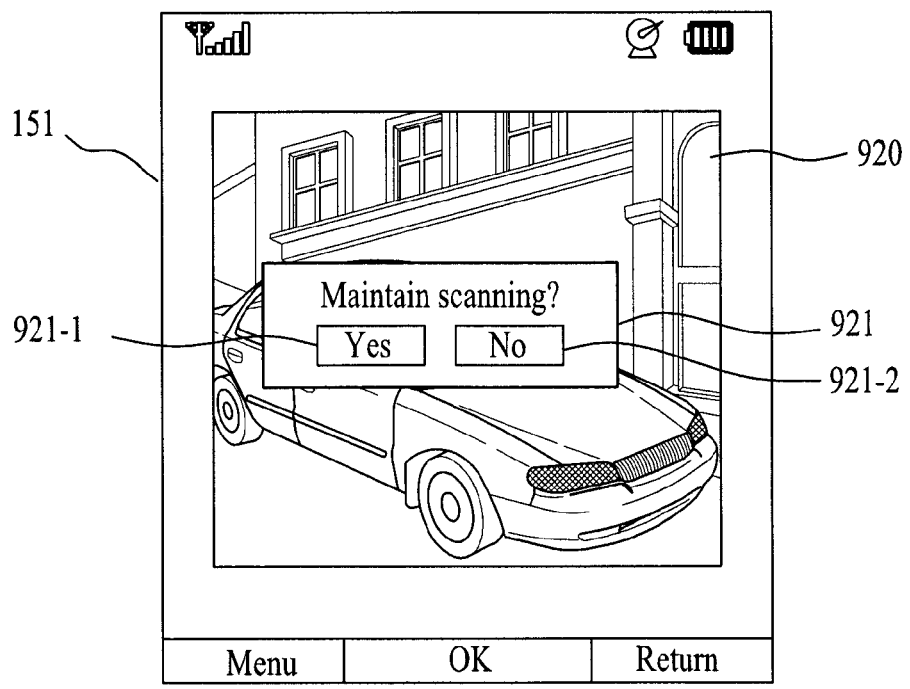
Figure 9C:
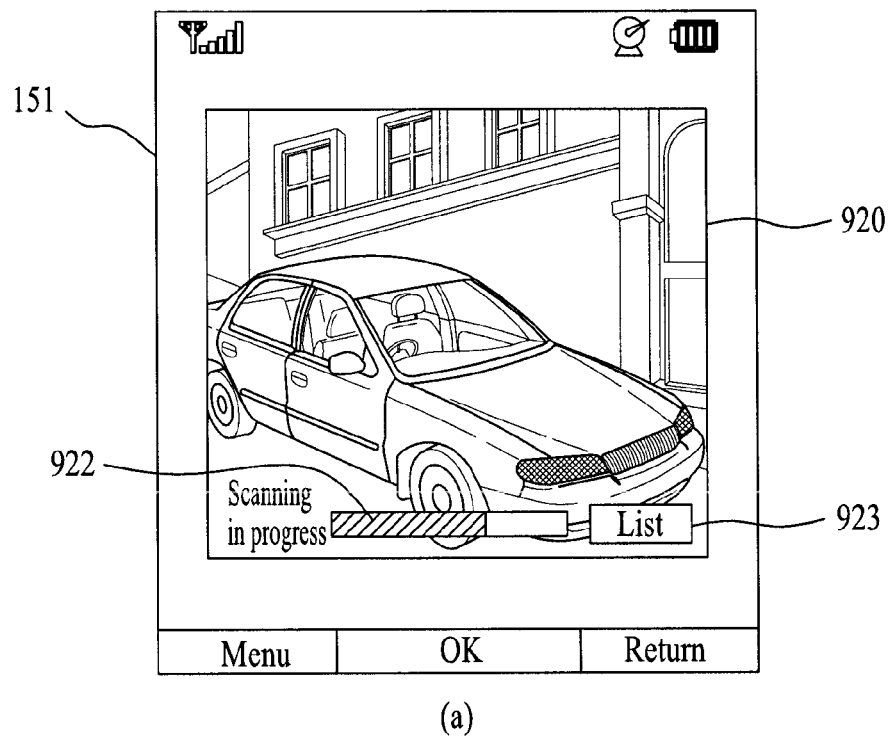
Figure 9C:
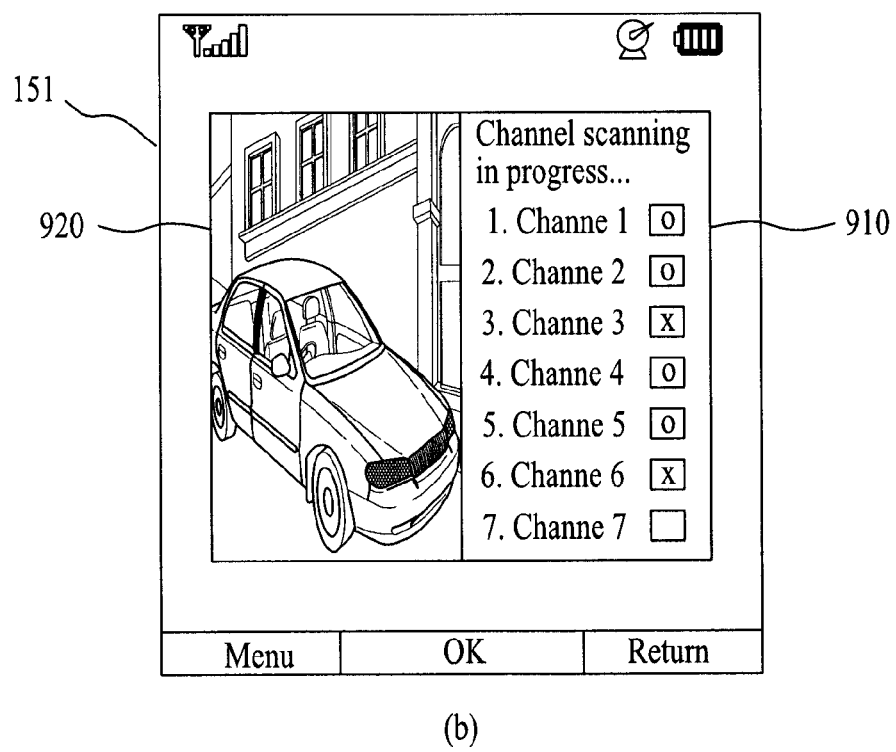

The mobile terminal 100 displays an indicator or progressive bar 922 indicating a channel scanning progression on a portion of a screen, as shown in FIG. 9C(a), if 'Yes' 921-1 is selected in FIG. 9B. Alternatively, the mobile terminal 100 divides a screen into a plurality of regions to display an output image 920 of a broadcast signal received via Channel 2 on a first region and a channel list 910, which indicates a real time channel scanning result, on a second region, as shown in FIG. 9C(b), if 'Yes' is selected to maintain the scanning operation in FIG. 9B.

Figure 9D:
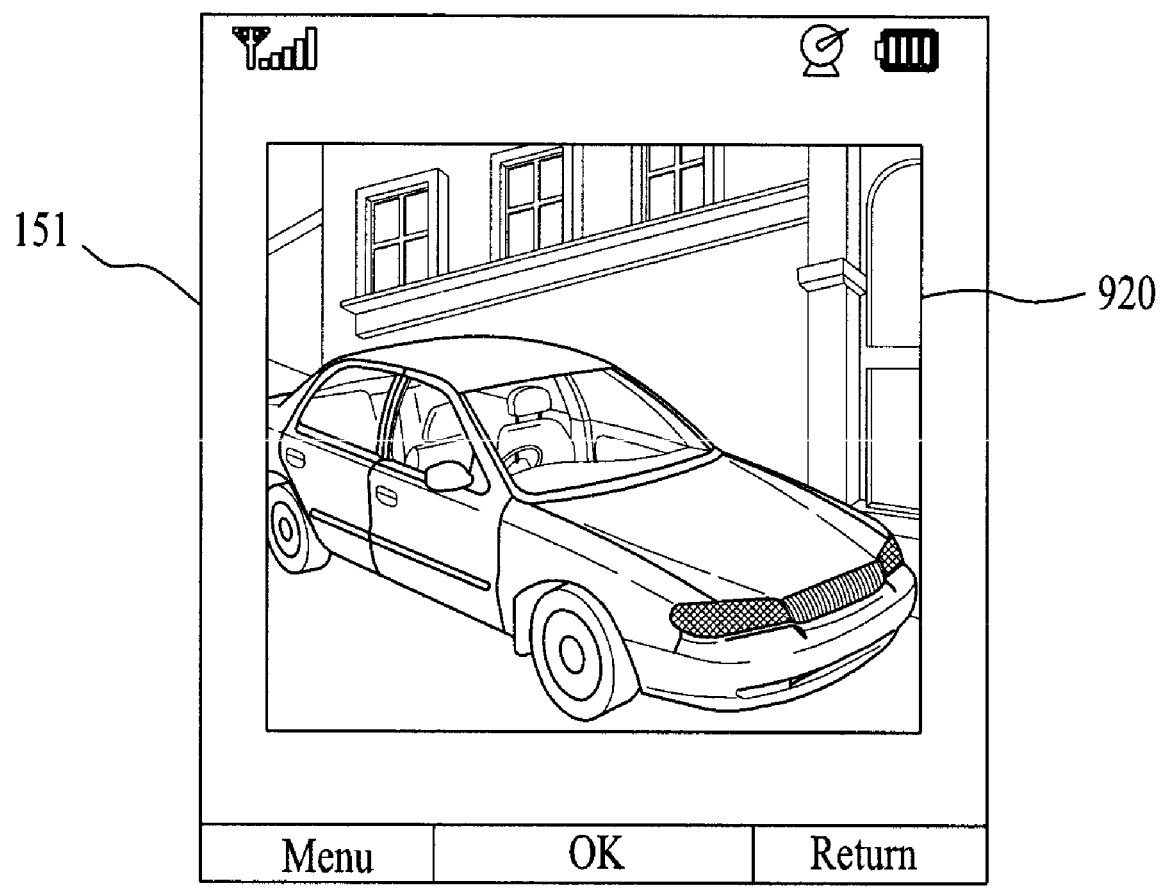

The mobile terminal 100 may display the channel list 910, as shown in FIG. 9C(b), if 'List' 923 is selected in FIG. 9C(a). The mobile terminal 100 stops the channel scan and outputs the broadcast signal received on channel 2, as shown in FIG. 9D, if 'No' 921-1 is selected in FIG. 9B.

The specific channel selection (S560) and broadcast signal output (S570) when performing both the broadcast signal output and channel scan simultaneously are explained in detail with reference to FIG. 10A and FIG. 10B. The mobile terminal 100 divides a screen into a plurality of regions to display an output image 1010 of a broadcast signal on a first region and a channel list 1020, which indicates a scanning result, on a second region, as shown in FIG. 10A, if a channel scanning operation is selected while a broadcast signal is being output or a broadcast signal output is selected during channel scanning.

Figure 10A:
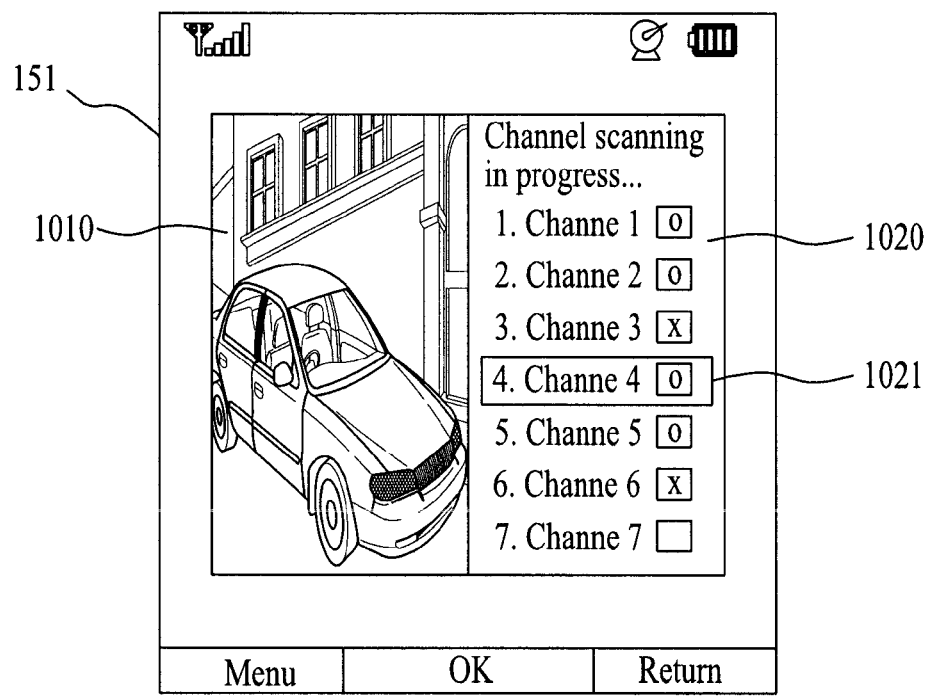
FIG. 10A and FIG. 10B illustrate screens of a process of selecting a channel and outputting a broadcast when executing both broadcast output and channel scanning in a mobile terminal according to one embodiment of the present invention.
Figure 10B:
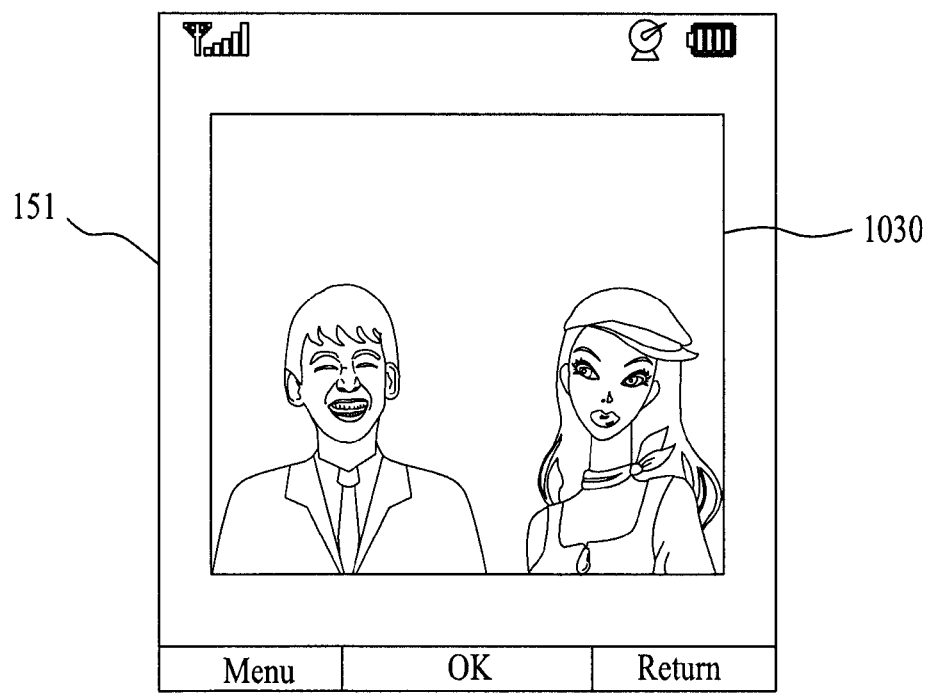

The mobile terminal 100 outputs a broadcast signal received on Channel 4 via the output unit 150, as shown in FIG. 10B, if reception-available channel 'Channel 4' 1021 is selected from the channel list 1020, as shown in FIG. 10A. Alternatively, the mobile terminal 100 divides the screen into a plurality of regions to display an output image of a broadcast signal received on a previous channel prior to channel selection from the channel list 1020 on a first region, and an output image of a broadcast signal received on the selected Channel 4 on a second region, if reception-available channel 'Channel 4' 1021 is selected from the channel list 1020, as shown in FIG. 10A. The audio output module 152 may output an audio signal synchronized with the output image displayed on either the first region or the second region.

The mobile terminal searches a relevant channel database for identification information related to a first program to identify a program corresponding to the first program in the second area to maintain the recording or viewing schedule for the first program in the second area based on the searched identification information, if the mobile terminal 100 that is scheduled for recoding or viewing of a first program in a first area moves into the second area.

Figure 11:
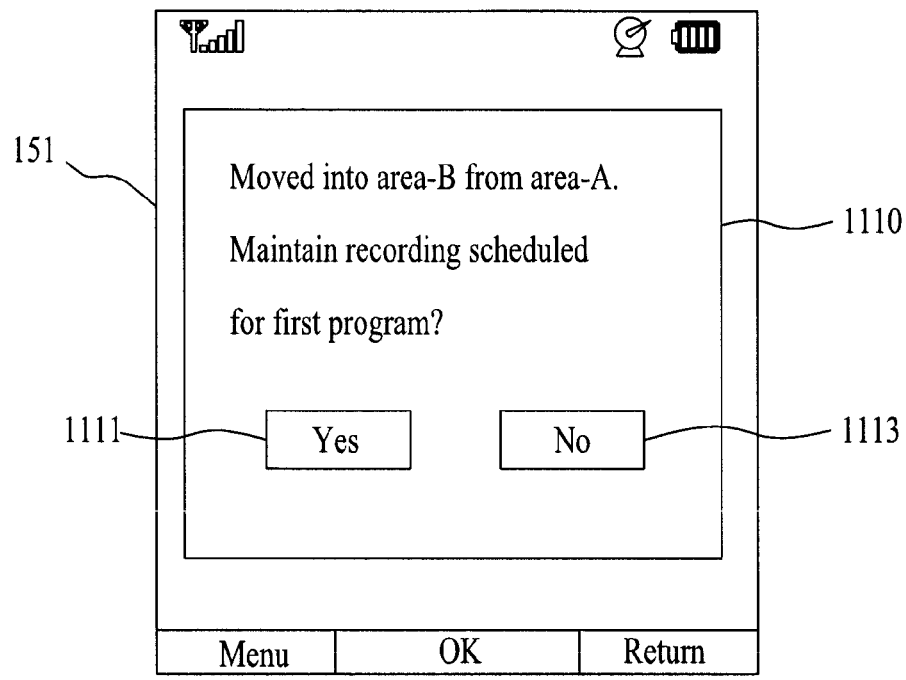
FIG. 11 illustrate screens of a process of scheduling recording of a broadcast program in a mobile terminal according to one embodiment of the present invention when the mobile terminal moves from one area to another area.
Figure 11:
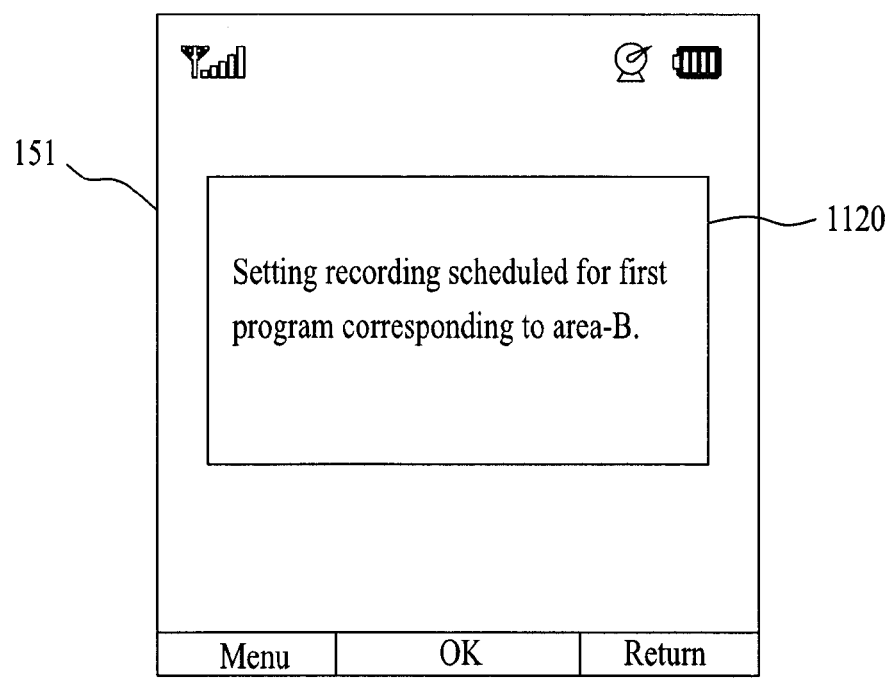

Referring to FIG. 11, it is assumed that a recording schedule for a first program was made in area-A and a channel for providing the first program is also supported in area-B. Since area-A and area-B differ from each other in the frequency of the channel for providing the first program, it is assumed that area-A and area-B differ from each other in channel identification information and program identification of the first program.

The mobile terminal displays a window 1110 for querying whether to maintain the recording schedule for the first program, as shown in FIG. 11(a), when it is determined by the position-location module 115 that the mobile terminal 100 has moved into area-B from area-A. The mobile terminal 100 sets a recording schedule for the first program corresponding to area-B, as shown in FIG. 11(b), if 'Yes' 111 is selected, as shown in FIG. 11(a).

The above-described channel scanning method of the mobile terminal may be implemented in a program recorded medium as computer-readable codes. The computer-readable media include all kinds of recording devices in which data readable by a computer system are stored.

The computer-readable media include ROM, RAM, CD-ROM, magnetic tapes, floppy discs, and optical data storage devices and also include carrier-wave type implementations, such as transmission via the Internet. Further, the computer may include the controller 180.

Accordingly, the present invention provides several effects and/or advantages. First, the present invention displays a channel list in which a real-time channel scanning result is indicated during channel scan, thereby providing the result of the channel scan to a user more quickly. Second, the present invention displays a channel list including both reception-available channels and reception-unavailable channels as a result of channel scan, thereby providing a user with information on the reception-unavailable channels instead of only the reception-available channels as in the related art. Third, the present invention enables a channel scan to be selectively maintained while outputting a broadcast signal on a channel selected from a channel list, thereby performing both broadcast output and channel scan simultaneously.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of scanning channels in a mobile terminal, the method comprising:
   receiving an input comprising entry of a reference via an input window;
   receiving channel information;
   generating a channel database using the received channel information;
   scanning at least one channel sorted in accordance with the reference; and
   displaying, in real time, a channel list being generated using the channel database by reflecting a result of real time channel scanning,
   wherein the at least one channel is sorted by extracting the channel database according to the reference such that the scanned at least one channel corresponds to the extracted channel database,
   wherein the reference comprises at least a specific channel or a program title of a channel to be scanned, and
   wherein the input window comprises a plurality of input boxes such that a plurality of specific channels, program titles, or combination thereof are receivable and displayable in the plurality of input boxes.

2. The method of claim 1, wherein the channel information comprises channel identification information or a frequency assigned to the at least one channel.

3. The method of claim 1, wherein the channel information is related to a specific area in which the mobile terminal is located.

4. A mobile terminal comprising:
   an user input unit configured to receive an input comprising entry of a reference via an input window;
   a wireless communication unit configured to receive channel information and to scan at least one channel sorted in accordance with the reference;
   a controller configured to generate a channel database using the received channel information and to generate a channel list according to a result of real time channel scanning using the channel database; and
   an output unit configured to display the channel list according to the result of the real time channel scanning under control of the controller,
   wherein the at least one channel is sorted by extracting the channel database according to the reference such that the scanned at least one channel corresponds to the extracted channel database,
   wherein the reference comprises at least a specific channel or a program title of a channel to be scanned, and
   wherein the input window comprises a plurality of input boxes such that a plurality of specific channels, program titles, or combination thereof are receivable by the user input unit and displayable in the plurality of input boxes.

5. The mobile terminal of claim 4, wherein the channel information comprises channel identification information or a frequency assigned to the at least one channel.

6. The mobile terminal of claim 4, wherein the channel information is related to a specific area in which the mobile terminal is located.

* * * * *